United States Patent
Terashima

(10) Patent No.: US 12,344,329 B2
(45) Date of Patent: Jul. 1, 2025

(54) STEERING CONTROL DEVICE

(71) Applicant: HITACHI ASTEMO, LTD., Hitachinaka (JP)

(72) Inventor: Kazuya Terashima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 220 days.

(21) Appl. No.: 17/909,957

(22) PCT Filed: Feb. 3, 2021

(86) PCT No.: PCT/JP2021/003909
§ 371 (c)(1),
(2) Date: Sep. 7, 2022

(87) PCT Pub. No.: WO2021/186932
PCT Pub. Date: Sep. 23, 2021

(65) Prior Publication Data
US 2023/0109098 A1    Apr. 6, 2023

(30) Foreign Application Priority Data

Mar. 17, 2020   (JP) ................. 2020-045946

(51) Int. Cl.
*B62D 5/04*    (2006.01)

(52) U.S. Cl.
CPC .......... *B62D 5/0478* (2013.01); *B62D 5/0403* (2013.01); *B62D 5/0421* (2013.01); *B62D 5/0481* (2013.01)

(58) Field of Classification Search
CPC .. B62D 5/0475; B62D 5/0403; B62D 5/0421; B62D 5/0481
See application file for complete search history.

(56) References Cited

U.S. PATENT DOCUMENTS 5,236,335 A * 8/1993 Takeuchi ............... B62D 5/001
    180/404
2004/0264075 A1* 12/2004 Kolomeitsev .......... H02P 29/02
    361/23

(Continued)

FOREIGN PATENT DOCUMENTS

JP    2004182063 A  *  7/2004
JP    2019-001345 A     1/2019

OTHER PUBLICATIONS

International Search Report dated Apr. 27, 2021 issued in International Application No. PCT/JP2021/003909, with English translation, 5 pages.

(Continued)

*Primary Examiner* — George C Jin
(74) *Attorney, Agent, or Firm* — FOLEY & LARDNER LLP

(57) ABSTRACT

A steering control device according to the present invention has an electromagnetic clutch (34) built into an electric motor (14B). The electromagnetic clutch (34) is provided with: an armature (61) connected to a first closing member (33) via a guide member (68), a coil holding part (59), and a bolt (65); a clutch plate (62) connected to a rotor (31) via a clutch plate attachment member (64), a key (69), and a motor shaft (32); and an excitation coil (60) held by the coil holding part (59). The armature (61) is fastened with the clutch plate (62) when not attracted to the excitation coil (60) during a power supply failure of the electric motor (14B), and regulates relative rotation of the rotor (31) with respect to a motor housing (29), Steering of a rack bar (10B) is thereby restricted at an optional steering position via the motor shaft (32), a worm shaft (25), and a steering shaft (8B).

18 Claims, 13 Drawing Sheets

(56) References Cited

U.S. PATENT DOCUMENTS

2007/0215405 A1* 9/2007 Tsutsumi ............. B62D 5/0481
                                                      180/402
2019/0126970 A1* 5/2019 Cimatti ............... B62D 5/0421
2019/0135332 A1* 5/2019 Cimatti ............... B62D 5/0454

OTHER PUBLICATIONS

Written Opinion dated Apr. 27, 2021 issued in International Application No. PCT/JP2021/003909, with English translation, 14 pages.

* cited by examiner

STEERING CONTROL DEVICE

TECHNICAL FIELD

The present invention relates to a steering control device.

BACKGROUND ART

A patent document 1 discloses a known steering control device as follows.

The steering control device disclosed in patent document 1 includes a braking mechanism capable of limiting steering of a steering member, wherein the steering member is employed for steering steerable wheels, and wherein the braking mechanism is in a longitudinally central position of the steering member. The braking mechanism is structured to limit steering of the steering member by fitting a wedge member with a recessed part fixed to the steering member.

PRIOR ART DOCUMENT(S)

Patent Document(s)

Patent Document 1: JP 2019-1345 A

SUMMARY OF INVENTION

Problem(s) to be Solved by the Invention

According to the steering control device disclosed in patent document 1, if an abnormality occurs in an actuator during steering of the steerable wheels, the wedge member is fitted with the recessed part after returning the steering member so as to bring the steerable wheels into their neutral positions. This makes it difficult to stabilize the steerable wheels early.

The present invention has been made in view of circumstances of conventional technology. It is an object of the present invention to provide a steering control device capable of stabilizing steerable wheels early in response to an abnormality in an actuator.

Means for Solving the Problem(s)

According to an embodiment of the present invention, a steering control device includes a braking mechanism structured to generate a braking force to inhibit steering of a steering member when the steering member is in an arbitrary steering position.

Effect(s) of the Invention

According to the present invention, it is possible to stabilize steerable wheels early in response to an abnormality in an actuator.

MODE(S) FOR CARRYING OUT INVENTION

The following describes steering control devices according to embodiments of the present invention with reference to the drawings. The steering control devices according to the following embodiments of the present invention are exemplified as being applied to rear wheel steering in a four-wheel steering system. However, the present invention is not limited to steering control devices for rear wheel steering, but may be applied to steering control devices for front wheel steering.

Figure 1:
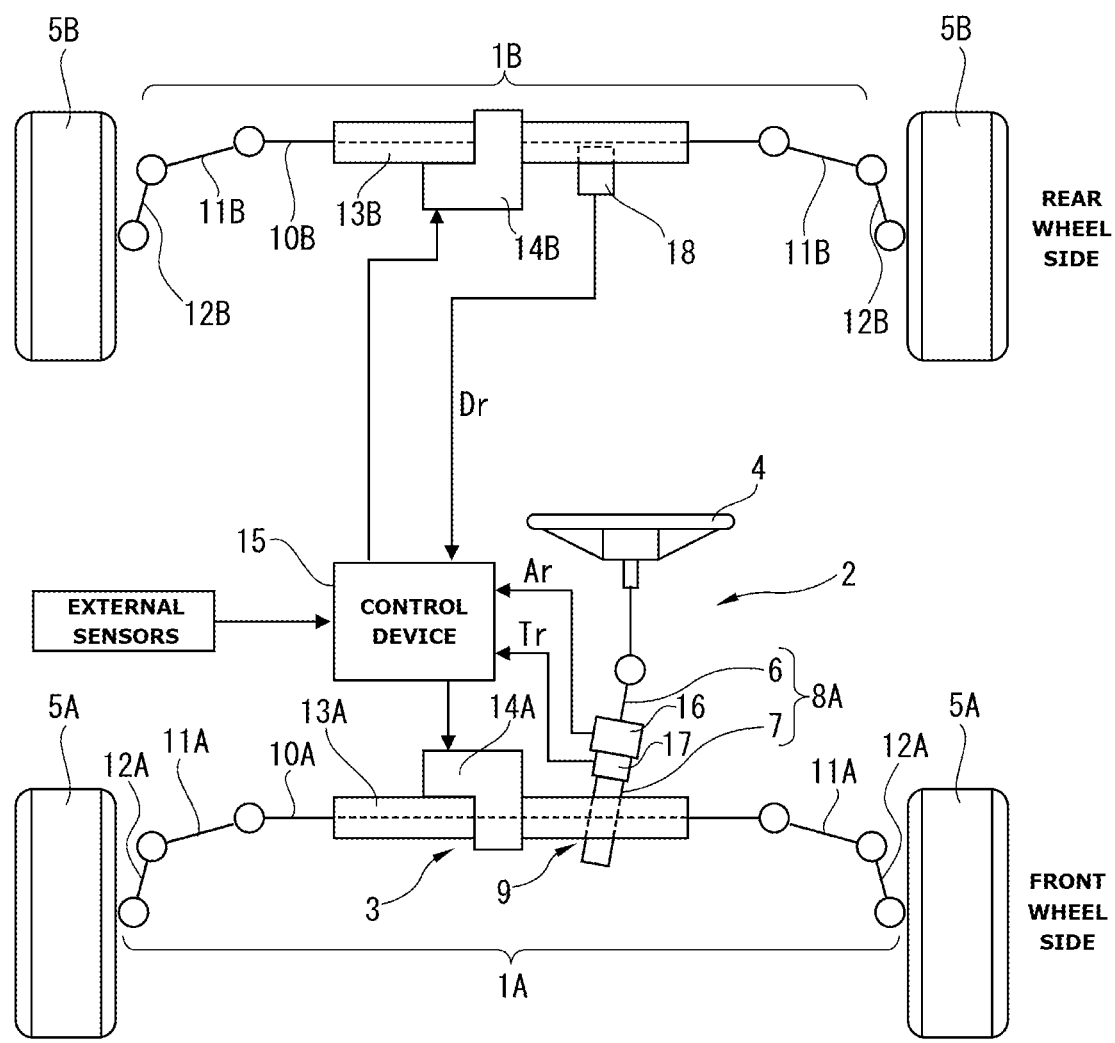
FIG. 1 is a schematic diagram of a steering system to which a steering control device according to a first embodiment is applied.

<First Embodiment> FIG. 1 is a schematic diagram of a steering system to which a steering control device according to a first embodiment is applied.

The steering system shown in FIG. 1 includes a front wheel steering device 1A for steering front wheels 5A, 5A, and a rear wheel steering device 1B for steering rear wheels 5B, 5B, wherein the front wheels 5A, 5A are steerable wheels on a front side of a vehicle, and the rear wheels 5B, 5B are steerable wheels on a rear side of the vehicle.

As shown in FIG. 1, the front wheel steering device 1A includes: a steering mechanism 2 structured to transmit a steering force from a driver; and a steering assist mechanism 3 structured to assist the driver in steering operation.

The steering mechanism 2 mechanically connects the front wheels 5A, 5A to a steering wheel 4, wherein the steering wheel 4 is arranged in a driver's cabin of the vehicle. The steering mechanism 2 includes a steering shaft 8A and a transmission mechanism 9. The steering shaft 8A includes: an input shaft 6 to which a rotational force is transmitted from the steering wheel 4; and an output shaft 7 connected to the input shaft 6 via a torsion bar not shown. The transmission mechanism 9 is structured to transmit rotation of the steering shaft 8A to the front wheels 5A, 5A. The transmission mechanism 9 is composed of a rack and pinion mechanism (rack and pinion gear) which includes: a pinion not shown provided on an outer periphery of the output shaft 7; and a rack not shown provided on an outer periphery of a rack bar 10A as a steering member. Both ends of the rack bar 10A are connected to the front wheels 5A, 5A via two tie rods 11A, 11A and two knuckle arms 12A, 12A, respectively.

The rack bar 10A is arranged to move in a longitudinal direction of the rack bar 10A in a cylindrical rack bar housing 13A formed of a metal material such as an aluminum alloy material.

The steering assist mechanism 3 includes an electric motor (or actuator) 14A structured to apply a steering force to the steering mechanism 2. The electric motor 14A is electrically connected to a control device (or ECU) 15. Furthermore, the electric motor 14A is connected to the rack bar 10A via a transmission device not shown. The electric motor 14A rotationally drives a nut not shown provided in the transmission device, and by rotation of the nut, moves the rack bar 10A in the longitudinal direction.

The control device 15 has a function of storing and executing various control processes, and controls driving of the electric motor 14A, based on a steering angle signal Ar from a steering angle sensor 16 provided to the steering shaft 8A, and a steering torque signal Tr from a steering torque sensor 17 also provided to the steering shaft 8A.

In the front wheel steering device 1A described above, when a driver rotates the steering wheel 4, the input shaft 6 rotates so as to twist the torsion bar, and thereby cause an elastic force of the torsion bar, and cause the output shaft 7 to rotate. The rotary motion of the output shaft 7 is converted into a linear motion in the longitudinal direction of the rack bar 10A by the rack and pinion mechanism, to push and pull the knuckle arms 12A, 12A in a vehicle lateral direction via the tie rods 11A, 11A, and thereby change the attitude of the front wheels 5A, 5A, respectively.

The rear wheel steering device 1B drives a rack bar 10B via a steering shaft 8B described below by controlling driving of an electric motor 14B based on the steering angle signal Ar, the steering torque signal Tr, and a displacement signal Dr described below. The rear wheel steering device 1B includes the rack bar 10B, tie rods 11B, 11B, knuckle arms 12B, 12B, and a rack bar housing 13B, which are configured similarly as the rack bar 10A, the tie rods 11A, 11A, the knuckle arms 12A, 12A, and the rack bar housing 13A of the front wheel steering device 1A. Both ends of the rack bar 10B are connected to the rear wheels 5B, 5B via the two tie rods 11B, 11B and the two knuckle arms 12B, 12B, respectively. Furthermore, the rack bar 10B is arranged to move in the longitudinal direction of the rack bar 10B in the cylindrical rack bar housing 13B, wherein the rack bar housing 13B is formed of a metal material such as an aluminum alloy material.

Furthermore, the rack bar 10B is provided with a displacement sensor 18 for sensing a longitudinal displacement of the rack bar 10B. The displacement signal Dr sensed by the displacement sensor 18 is transmitted to the control device 15.

The rear wheel steering device 1B rotationally drives the steering shaft 8B described below by controlling driving of the electric motor 14B based on the steering angle signal Ar, the steering torque signal Tr, and the displacement signal Dr. The rotary motion of the steering shaft 8B is converted into a linear motion in the longitudinal direction of the rack bar 10B by a rack and pinion mechanism not shown, so as to push and pull the knuckle arms 12B and 12B in the vehicle lateral direction via the tie rods 11B and 11B, and thereby change the attitude of the rear wheels 5B, 5B, respectively.

Figure 2:
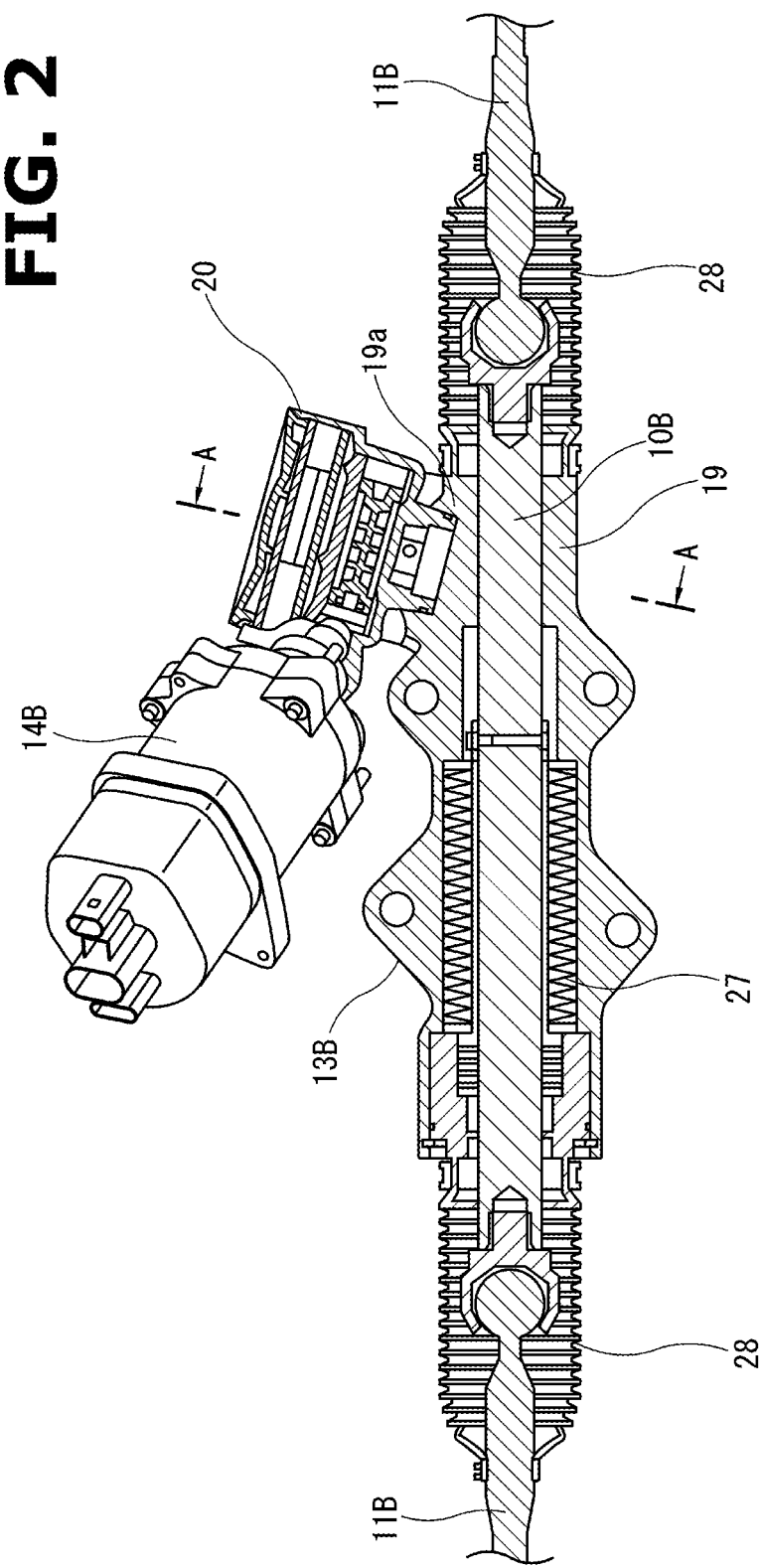
FIG. 2 is a longitudinal sectional view of a rear wheel steering device.
Figure 3:
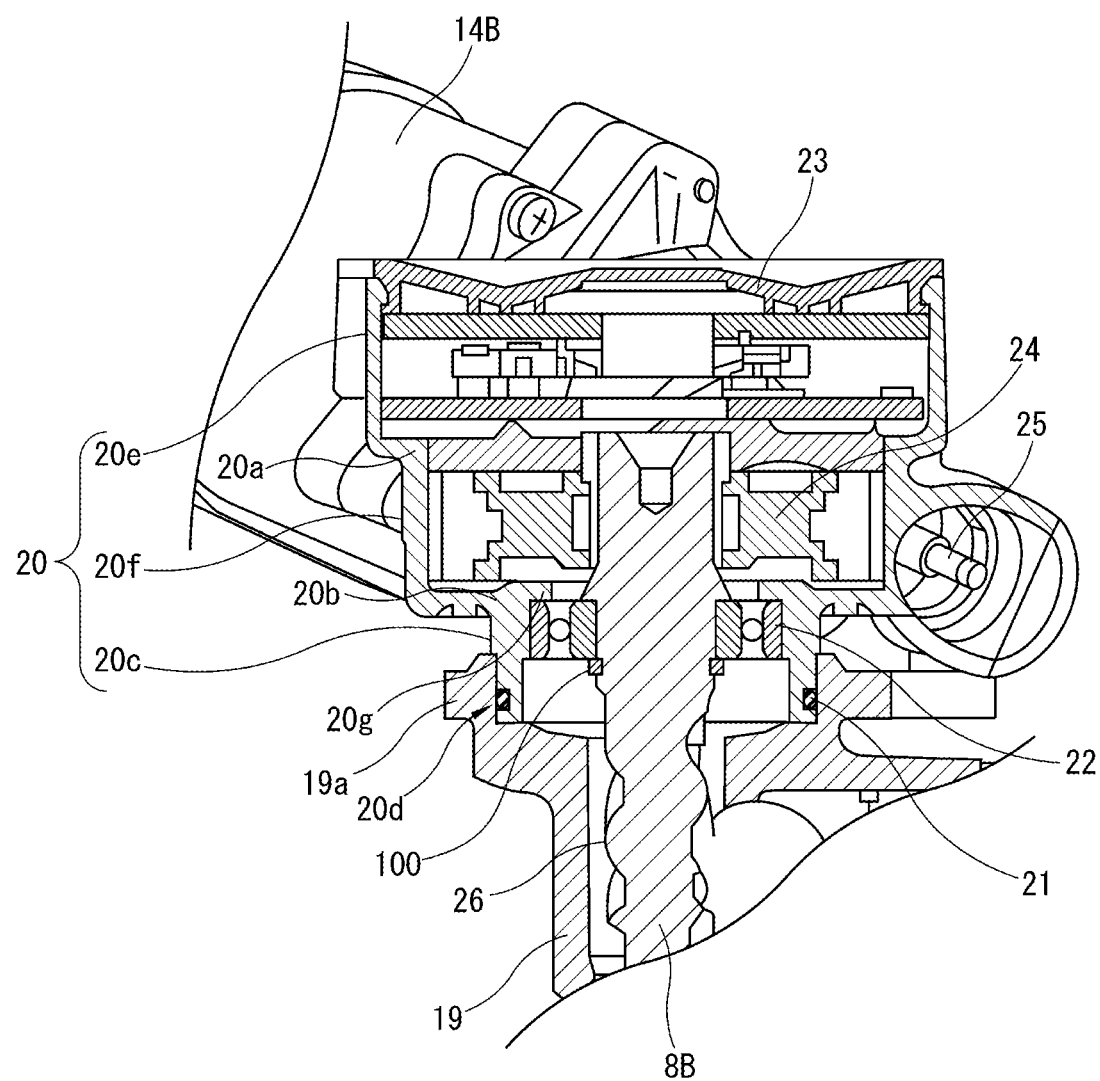
FIG. 3 is a sectional view of a steering shaft and others taken along a line A-A in FIG. 2.

FIG. 2 is a longitudinal sectional view of the rear wheel steering device 1B. FIG. 3 is a sectional view of the steering shaft 8B and others taken along a line A-A in FIG. 2. In FIG. 2, the steering shaft 8B is omitted.

The rack bar housing 13B has a narrow cylindrical shape and includes a cylindrical tubular part 19 that accommodates the rack bar 10B movably. A steering shaft housing 20 is provided at a position closer to the tie rod 11B on one side portion of an outer periphery of the cylindrical tubular part 19 (on the right side in FIG. 2), for accommodating the steering shaft 8B.

As shown in FIG. 3, the steering shaft housing 20 is formed in a cylindrical shape whose diameter decreases by two steps at two step portions 20a, 20b. The steering shaft housing 20 cooperates with the cylindrical tubular part 19 of the rack bar housing 13B to accommodate the steering shaft 8B. A small diameter tubular portion 20c located on the small diameter side of the steering shaft housing 20 has an outer peripheral portion fitted to an inner peripheral portion of a ring-shaped mounting portion 19a provided on the outer periphery of the cylindrical tubular part 19. The small diameter tubular portion 20c includes an outer periphery formed with an annular groove 20d being continuous annularly. An annular first sealing member 21 is formed of rubber or the like and is fitted in the annular groove 20d to hermetically seal between the outer peripheral surface of the small diameter tubular portion 20c and the inner peripheral surface of the mounting portion 19a. Furthermore, a bearing 22 is provided at a position near the step portion 20b on the inner peripheral surface of the small diameter tubular portion 20c, for supporting the steering shaft 8B rotatably. The bearing 22 is made to abut on an inner edge portion 20g of the small diameter tubular portion 20c, wherein longitudinal movement of the steering shaft 8B is restricted by a retaining ring 100 provided on the outer periphery of the steering shaft 8B. Furthermore, a large diameter tubular portion 20e located on the large diameter side of the steering shaft housing 20 has an opening that is closed by a disk-shaped lid member 23. A worm wheel 24 provided on the outer periphery of the steering shaft 8B is housed in a medium diameter cylinder portion 20f located between the large diameter cylinder portion 20e and the small diameter cylinder portion 20c. The worm wheel 24 meshes with a worm gear not shown on an outer periphery of a worm shaft 25. The worm shaft 25 is attached to a motor shaft 32 described below of the electric motor 14B.

The steering shaft 8B is housed in the steering shaft housing 20 and the cylindrical tubular part 19 so as to pass through the steering shaft housing 20 and project into the cylindrical tubular part 19. A pinion 26 is formed in a portion of the outer periphery of the steering shaft 8B that is housed in the cylindrical tubular part 19, wherein the pinion 26 meshes with a rack not shown on the outer periphery of the rack bar 10B.

Furthermore, inside the cylindrical tubular part 19, disc springs 27 are mounted at a longitudinal position closer to the second tie rod 11B (on the left side in FIG. 2), and are capable of biasing the rack bar 10B so as to cause the rear wheels 5B, 5B to return to their neutral position. Configuration of the disc springs 27 is described in detail below.

Both longitudinal ends of the cylindrical tubular part 19 are provided with bellows-shaped boots 28, 28 respectively, to cover an outer periphery of one end portion of each of the two tie rods 11B, 11B. The boots 28 and 28 are formed of an elastic material such as a synthetic rubber material so as to ensure a predetermined flexibility, and prevent water, dust, etc. from entering the rack bar 10B and others.

Figure 4:
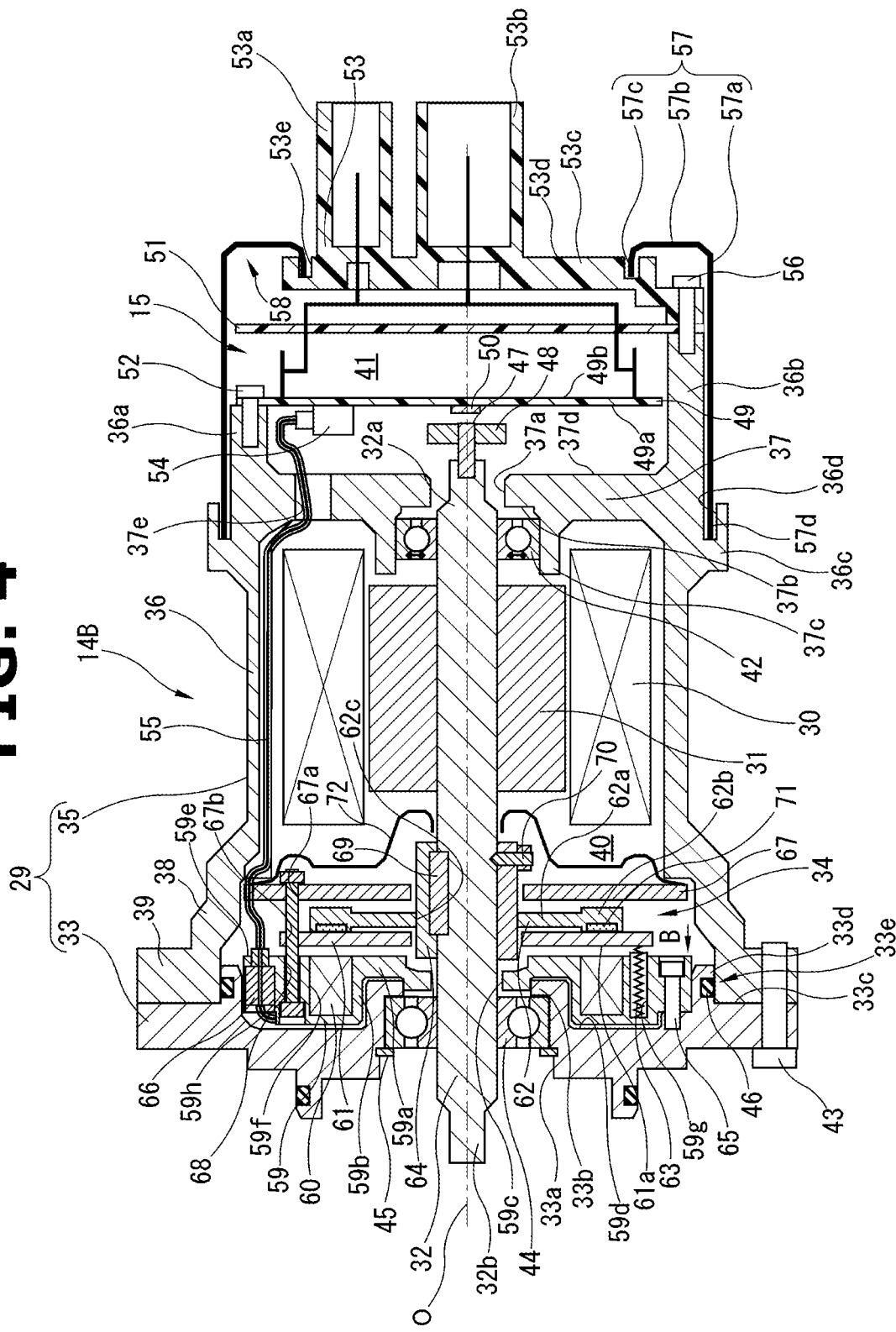
FIG. 4 is a longitudinal sectional view of an electric motor according to the first embodiment.
Figure 5:
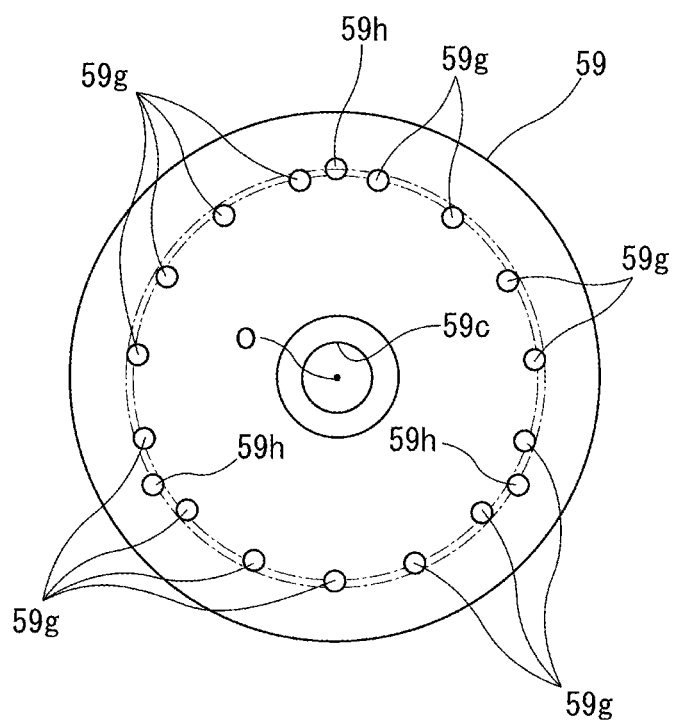
FIG. 5 is a view of a coil holding part as viewed along an arrow B in FIG. 4.

FIG. 4 is a longitudinal sectional view of the electric motor 14B according to the first embodiment. FIG. 5 is a view of a coil holding part 59 as viewed in the direction of an arrow B in FIG. 4. FIG. 5 is mainly intended to show where a spring accommodation recess 59g and a support hole 59h are formed, wherein a coil spring 63, a guide member 68, an exciting coil 60, a second relay part 66, and a bolt 65 are omitted.

The electric motor 14B is a three-phase (U-phase, V-phase, and W-phase) alternating current motor composed of two systems, and is configured integrally with the control device 15. The electric motor 14B includes: a motor housing 29; a stator 30 and a rotor 31 arranged in the motor housing 29; and the motor shaft 32 that rotates integrally with rotation of the rotor 31. The electric motor 14B has a built-in electromagnetic clutch 34 between the stator 30 and rotor 31 and a first enclosing member 33, wherein the electromagnetic clutch 34 is a braking mechanism structured to be engaged when the electric motor 14B is abnormal, for example, at the time of a power supply failure.

For convenience of the following description, a direction along a rotation axis O of the motor shaft 32 is defined as "axial direction", a direction orthogonal to the rotation axis O of the motor shaft 32 is defined as "radial direction", and a direction around the rotation axis O of the motor shaft 32 is defined as "circumferential direction".

The motor housing 29 includes a cylindrical housing tubular member 35, and the first enclosing member 33 that encloses an opening of the housing tubular member 35. The housing tubular member 35 is made of a metal material, and includes: a cylindrical tubular part 36; a partition wall part 37 formed at a position closer to a first axial end of the tubular part 36; a diameter-expanded portion 38 that expands in diameter from a second axial end of the tubular part 36 in a stepwise manner; and an annular flange 39 that extends radially outward from the diameter-expanded portion 38.

The partition wall part 37 has a substantially circular plate shape that separates a motor accommodation space 40 and a control device accommodation space 41 from each other, wherein the motor accommodation space 40 accommodates motor components such as the rotor 31, and the control device accommodation space 41 accommodates the control device 15. The partition wall part 37 has a partition wall portion through hole 37a through which a first axial end portion 32a of the motor shaft 32 extends. The partition wall part 37 includes an axial inner end face 37b in which an annular projecting portion 37c is formed at a radial position near the partition wall portion through hole 37a and projects inward in the axial direction from the axial inner end face 37b. A first bearing 42 is provided on the inner peripheral surface of the annular protrusion 37c to rotatably support an outer peripheral portion of the motor shaft 32 near the axial end portion 32a.

The first enclosing member 33 is formed of a metal material in a circular plate shape, and is attached and fixed to an outer axial end surface of the flange 39 of the housing cylindrical member 35 via a fixing member such as a bolt 43. The first enclosing member 33 includes a central portion formed with an enclosing member through hole 33a through which the motor shaft 32 extends. The enclosing member through hole 33a is provided with a second bearing 44 that rotatably supports an outer peripheral portion of the motor shaft 32 near a second axial end portion 32b. The second bearing 44 is made to abut on an annular projection 33b formed in an inner edge portion of a first axial side of the closing member through hole 33a, and is pressed toward the axial end portion 32a by a retaining ring 45. Furthermore, an annular standing portion 33d is formed in an inner axial face 33c of the first enclosing member 33, and abuts on the inner peripheral surface of the flange 39. An annular seal groove 33e is formed in the outer peripheral face of the standing portion 33d. An annular second seal member 46 is formed of rubber or the like, and is fitted in the seal groove 33e to hermetically seal between the outer peripheral surface of the standing portion 33d and the inner peripheral surface of the flange 39.

The rotor 31 is fixed to an outer peripheral portion of the motor shaft 32 near the first axial end portion 32a. The stator 30 is provided radially outside the rotor 31. A sensor magnet 48 is press-fitted and attached to the axial end portion 32a of the motor shaft 32 by a fixing member such as a pin 47. Furthermore, the worm shaft 25 (see FIG. 3), which is connected to the steering shaft 8B (see FIG. 3), is attached to the second axial end portion 32b of the motor shaft 32.

As shown in FIG. 4, the axial end part of the tubular part 36 closer to the partition wall part 37 has a first axial end portion 36a on the upper side, and a second axial end portion 36b on the lower side, wherein the first axial end portion 36a has a shorter axial projection with respect to the partition wall part 37 than the second axial end portion 36b.

The control device 15, which is configured integrally with the electric motor 14B, is arranged in the control device accommodation space 41 formed between the partition wall part 37 and a second enclosing member 53 and a first cover member 57 described below. The control device 15 includes: a microprocessor not shown; a first board 49 on which the microprocessor is mounted; a sensor IC 50 mounted on the first board 49; and a second board 51.

The first board 49 is arranged in the control device accommodation space 41 so as to be orthogonal to the rotation axis O of the motor shaft 32 and face an outer surface 37d of the partition wall part 37. The first board 49 is attached and fixed to an axial end face of the first axial end portion 36a via a fixing member such as a bolt 52. The first board 49 is formed of a non-conductive resin material such as glass epoxy resin, and is formed with a conductor pattern not shown on each side thereof, wherein a large number of electric components including the microprocessor are mounted on the conductor pattern. The first board 49 has a face 49a closer to the partition wall part 37, wherein the sensor IC 50 is mounted on the face 49a at a position facing the sensor magnet 48 provided to the motor shaft 32, for sensing a change in the magnetic field of the sensor magnet 48. Furthermore, an opposite face 49b of the first board 49 is connected to a battery not shown via connector portions 53a and 53b formed integrally with the second enclosing member 53. Furthermore, the face 49a is provided with a first relay part 54 that relays electric power from the battery. The first relay part 54 is electrically connected to a second relay part 66 described below in the vicinity of the first enclosing member 33 via a harness 55, wherein the harness 55 extends through a through hole 37e formed through the partition wall part 37.

The second board 51 is arranged in the control device accommodation space 41 so as to be orthogonal to the rotation axis O of the motor shaft 32 and face the face 49b of the first board 49. The second board 51 is sandwiched between the axial end face of the second axial end portion 36b and the axial end face of the second enclosing member 53, and is fixed to the second axial end portion 36b and the second enclosing member 53 by a fixing member such as a bolt 56.

The second enclosing member 53 is made of a synthetic resin material, and includes a substantially circular plate-shaped part 53c for closing the control device accommodation space 41, and the connector portions 53a and 53b for supplying electric power and others, wherein the plate-shaped part 53c and the connector portions 53a and 53b are formed integrally. The plate-shaped part 53c includes an axial outer face 53d in which a first annular groove 53e is formed at a position near the outer periphery of the plate-shaped part 53c, wherein an annular first insertion part 57c of the first cover member 57 is inserted into the first annular groove 53e.

The first cover member 57 is formed of a metal material into a substantially cylindrical shape. The first cover member 57 includes: a cylindrical tubular base part 57a extending in parallel with the rotation axis O of the motor shaft 32; an annular side wall part 57b protruding radially inward from one end of the cylindrical tubular base part 57a; and an annular first insertion part 57c that is parallel to the cylindrical tubular base part 57a and stands from the side wall part 57b so as to form an annular recess 58 between the cylindrical tubular base part 57a and the side wall part 57b.

The first insertion part 57c is inserted in the first annular groove 53e of the plate-shaped part 53c. The first annular groove 53e is filled with a potting material not shown made of urethane resin or the like so that the first insertion part 57c is fixed to the plate-shaped part 53c.

Furthermore, the cylindrical tubular base part 57a includes a second insertion part 57d at the axial end of the cylindrical tubular base part 57a opposite to the side wall part 57b, wherein the second insertion part 57d is inserted in a second annular groove 36d of the tubular part 36, wherein the second annular groove 36d is formed in an extended portion 36c at the outer periphery of the tubular part 36, and has an opening facing in the same direction as the first annular groove 53e. The second insertion part 57d is fixed to the extended portion 36c via a potting material not shown made of urethane resin or the like filled in the second annular groove 36d.

The electromagnetic clutch 34 is arranged between the stator 30 and rotor 31 and the first enclosing member 33 in the motor accommodation space 40 inside the tubular part 36. In a state where the electromagnetic clutch 34 is housed in the motor accommodation space 40, the first board 49, the sensor IC 50, the sensor magnet 48, the rotor 31, and the electromagnetic clutch 34 are arranged in this order from the second enclosing member 53 side to the first enclosing member 33 side in the direction of the rotation axis O of the motor shaft 32. The electromagnetic clutch 34 includes the coil holding part 59, the exciting coil 60, an armature 61, a clutch plate 62, coil springs 63, and a clutch plate mounting member 64. The electromagnetic clutch 34 regulates or inhibits rotation of the rotor 31 with respect to the motor housing 29 by engaging the armature 61 with the clutch plate 62 when the exciting coil 60 is de-energized.

The coil holding part 59 is formed in a circular plate shape, and includes a relatively thin-walled portion 59a located in the central portion and a relatively thick-walled portion 59b located radially outside of the thin-walled portion 59a. The thin-walled portion 59a has a central portion formed with a thin-walled portion through hole 59c through which the motor shaft 32 extends. Furthermore, the thick-walled portion 59b is fitted into an annular accommodating groove 59d formed in the inner axial face 33c of the first enclosing member 33, and is attached and fixed to the first enclosing member 33 by a fixing member such as a bolt 65. The thick-walled portion 59b has an axial end face 59e facing the armature 61, wherein the axial end face 59e is formed with a coil holding groove 59f for holding the exciting coil 60, and wherein the coil holding groove 59f is located closer to the inner side of the thick-walled portion 59b in the radial direction. As viewed in the radial direction of the motor shaft 32, while the exciting coil 60 is held in the coil holding groove 59f, a bottom side region of the coil holding groove 59f overlaps with an inside region of the second bearing 44 in the axial direction. Furthermore, the exciting coil 60 is electrically connected to the harness 55 that passes through the second relay part 66 provided on the outer peripheral portion of the thick-walled portion 59b. Furthermore, as shown in FIG. 5, on the axial end face 59e of the thick-walled portion 59b, a plurality of (15 in this embodiment) circular spring accommodation recesses 59g are arranged at positions radially outside the exciting coil 60, and evenly spaced in the circumferential direction of the coil holding part 59. In each spring accommodation recess 59g, a biasing member such as a coil spring 63 is arranged in a compressed state and is structured to bias the armature 61 with respect to the clutch plate 62. Each coil spring 63 has an end connected to the bottom of the spring accommodation recess 59g, and another end connected to the surface 61a of the armature 61 facing the coil spring 63.

Furthermore, the thick-walled portions 59b is formed with three circular support holes 59h positioned at corresponding three locations radially outside the coil holding part 59, specifically, at three locations that overlap with the spring accommodation recesses 59g as viewed in the circumferential direction as shown in FIG. 5. The support hole 59h cooperates with a support hole 67a of a circular plate-shaped guide support member 67 provided between the coil holding part 59 and the stator 30 and the rotor 31 in the motor accommodation space 40 to hold a columnar guide member 68 that guides the armature 61 along the rotation axis O.

The armature 61 has a circular plate shape, and is slidably connected to the guide member 68 between the coil holding part 59 and the clutch plate 62 via a guide hole 67b formed in the outer peripheral portion of the armature 61. The armature 61 is connected to the first enclosing member 33, which constitutes a part of the motor housing 29, via the guide member 68, the coil holding part 59, and the bolt 65. As described above, the armature 61 does not need to be directly connected to the motor housing 29, but may be indirectly connected to the motor housing 29. The armature 61 is axially separated from the clutch plate 62 when the armature 61 is attracted to the exciting coil 60 by a magnetic force generated by the exciting coil 60, and is engaged with a brake lining 71 described below of the clutch plate 62 by a biasing force of each coil spring 63 when the armature 61 is not attracted to the exciting coil 60, thereby inhibiting rotation of the rotor 31 with respect to the motor housing 29.

The clutch plate 62 is formed in a circular plate shape, and arranged between the armature 61 and the guide support member 67 in the motor accommodation space 40. The clutch plate 62 has a relatively thin plate portion 62a located inside in the radial direction and a relatively thick plate portion 62b located outside in the radial direction. A fixing hole 62c is formed in a central portion of the thin plate portion 62a. The clutch plate 62 is fixed to the outer periphery of the cylindrical clutch plate mounting member 64 via the fixing hole 62c. The clutch plate mounting member 64 is mounted on the outer periphery of the motor shaft 32 by a fixing member such as a screw member 70, in a state where rotation of the clutch plate mounting member 64 with respect to the motor shaft 32 is restricted by a key 69. The clutch plate 62 is connected to the rotor 31 via the clutch plate mounting member 64, the key 69, and the motor shaft 32. As described above, the clutch plate 62 does not need to be directly connected to the rotor 31, but may be indirectly connected to the rotor 31. Furthermore, the thick plate portion 62*b* is provided with the brake lining 71 (indicated by dots in FIG. 4) that engages with the engaging surface of the armature 61 when the electric power of the electric motor 14B fails, wherein the brake lining 71 is located to face the exciting coil 60 through the armature 61. The brake lining 71 has a ring shape continuous in the circumferential direction near the outer periphery of the clutch plate 62.

In the electric motor 14B described above, the rotor 31, the clutch plate 62, the armature 61, and the exciting coil 60 are arranged in this order from the first axial end portion 32*a* to the second axial end portion 32*b* in the direction of the rotation axis O of the motor shaft 32.

Furthermore, in the motor accommodation space 40, a second cover member 72 is provided between the guide support member 67 and the stator 30 and rotor 31, for suppressing entry of wear debris from the brake lining 71 to the stator 30 and the rotor 31. The second cover member 72 is formed of a metal material into a circular plate shape. The second cover member 72 is fixed by sandwiching a part of an outer peripheral edge portion of the second cover member 72 in a gap between the guide support member 67 and the enlarged diameter portion 38. The second cover member 72 has an inner peripheral edge portion slightly separated away from the motor shaft 32.

In the electric motor 14B, when the power of the electric motor 14B fails, the armature 61 is not attracted to the exciting coil 60 and is engaged with the brake lining 71 of the clutch plate 62 by the biasing force of each coil spring 63. This inhibits rotation of the rotor 31 with respect to the motor housing 29. The inhibition of the relative rotation of the rotor 31 also inhibits movement of the rack bar 10B connected to the rotor 31 via the motor shaft 32, the worm shaft 25, and the steering shaft 8B. Namely, the inhibition of the relative rotation of the rotor 31 inhibits steering of the rack bar 10B when the rack bar 10B is at an arbitrary position in the axial direction, namely, at an arbitrary steering position. Engagement between the armature 61 and the brake lining 71 serves to cause a braking force when the rack bar 10B is at an arbitrary position in the axial direction, and does not necessarily lock steering of the rear wheels 5B, 5B when the rack bar 10B is at the arbitrary position.

Figure 6:
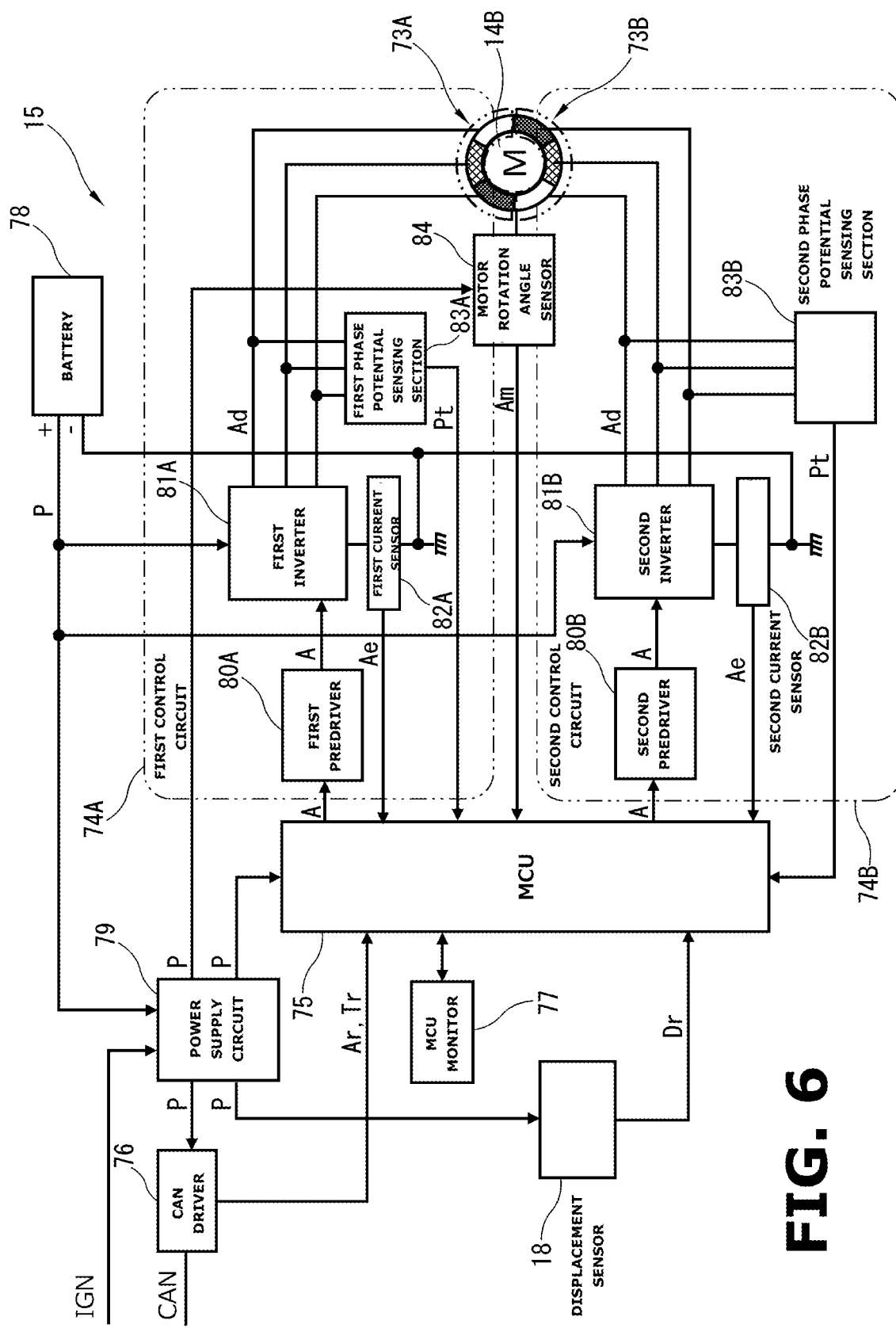
FIG. 6 is a system block diagram of a control device.

FIG. 6 is a system block diagram of the control device 15.

The electric motor 14B, which is controlled by the control device 15, includes a first stator coil 73A corresponding to a first system, and a second stator coil 73B corresponding to a second system, wherein the second stator coil 73B is electrically separated from the first stator coil 73A. The first stator coil 73A is driven by a first control circuit 74A (indicated by a part surrounded by a long dashed double-short dashed line) provided in the control device 15, whereas the second stator coil 73B is driven by a second control circuit 74B (indicated by a part surrounded by a long dashed double-short dashed line) provided in the control device 15. The first control circuit 74A and the second control circuit 74B are connected to an MCU 75 provided in the control device 15. The steering angle signal Ar and steering torque signal Tr acquired via a CAN driver 76, and the displacement signal Dr sensed by the displacement sensor 18 are inputted to the MCU 75. The MCU 75 calculates a torque command value A for the electric motor 14B based on the steering angle signal Ar, the steering torque signal Tr, and the displacement signal Dr. Furthermore, the MCU 75 is electrically connected to an MCU monitor 77 and a power supply circuit 79, wherein the MCU monitor 77 monitors the MCU 75, and the power supply circuit 79 supplies electric power P from a battery 78 to the MCU 75.

The first control circuit 74A includes a first predriver 80A and a first inverter 81A.

The first predriver 80A is an integrated circuit (IC) to which the torque command value A is inputted from the MCU 75.

The first inverter 81A is driven and controlled based on the torque command value A from the first predriver 80A, and converts the electric power P from the battery 78 as a power source from a direct current to a three-phase alternating current, to supply an obtained motor drive current Ad to the electric motor 14B. Furthermore, a motor current Ae, which is an electric current actually flowing in the electric motor 14B, is fed back to the MCU 75 by a first current sensor 82A provided to the first inverter 81A. A potential Pt between the first inverter 81A and the electric motor 14B is sensed by a first phase potential sensing section 83A and fed back to the MCU 75.

The second control circuit 74B includes a second predriver 80B and a second inverter 81B, which are configured in the same manner as the first predriver 80A and the first inverter 81A.

The second predriver 80B is an integrated circuit (IC) to which the torque command value A is inputted from the MCU 75.

The second inverter 81B is driven and controlled based on the torque command value A from the second predriver 80B, and converts the electric power P from the battery 78 as a power source from a direct current to a three-phase alternating current, to supply an obtained motor drive current Ad to the electric motor 14B. Furthermore, the motor current Ae, which is an electric current actually flowing in the electric motor 14B, is fed back to the MCU 75 by a second current sensor 82B provided to the second inverter 81B. A potential Pt between the second inverter 81B and the electric motor 14B is sensed by a second phase potential sensing section 83B and fed back to the MCU 75.

Furthermore, a motor rotation angle sensor 84 is electrically connected to the electric motor 14B, for sensing a motor rotation angle Am of the electric motor 14B. The motor rotation angle Am sensed by the motor rotation angle sensor 84 is transmitted to the MCU 75. Furthermore, the electric power P from the power supply circuit 79 is supplied to the motor rotation angle sensor 84.

Figure 7:
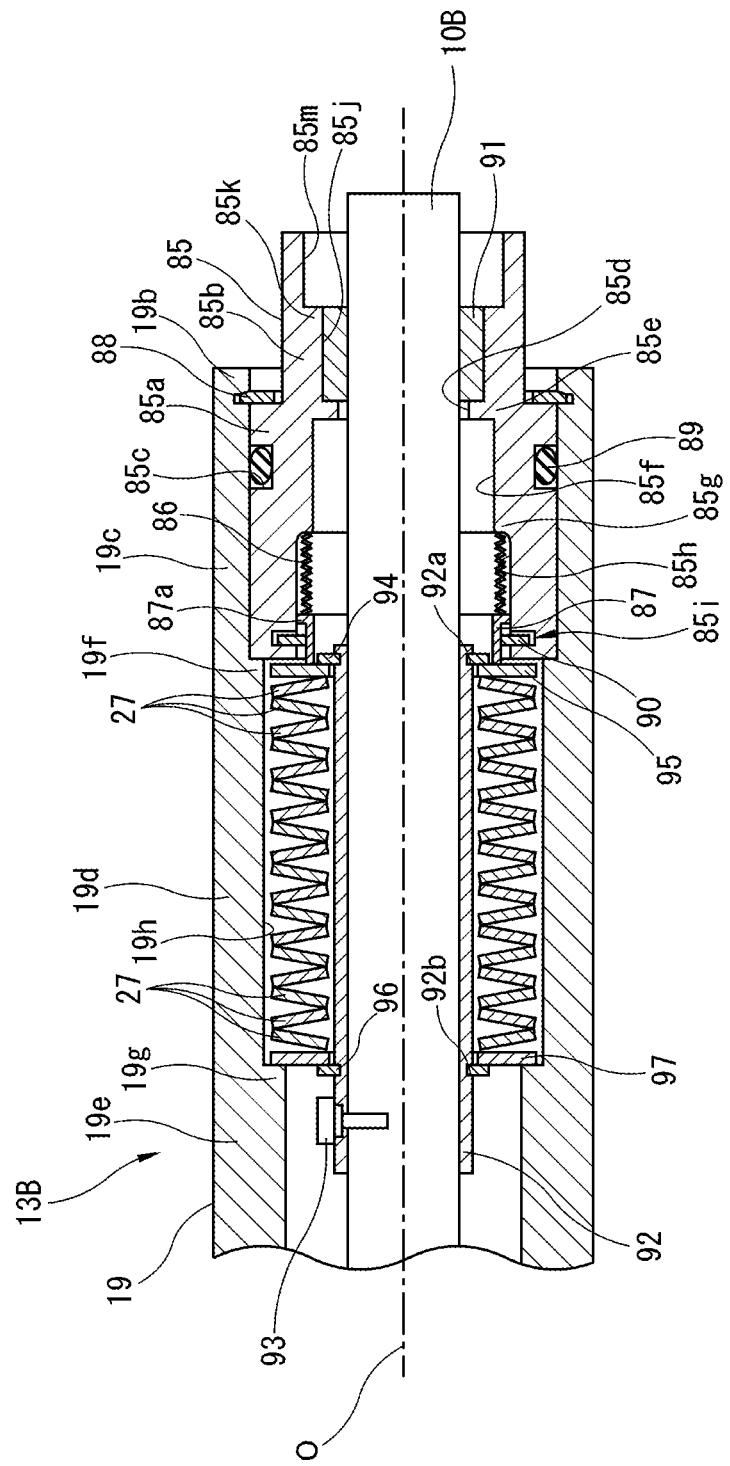
FIG. 7 is a partial longitudinal sectional view of a cylindrical tubular part of a rack bar housing and others, showing a series of disc springs when rear wheels are in their neutral positions.
Figure 8A:
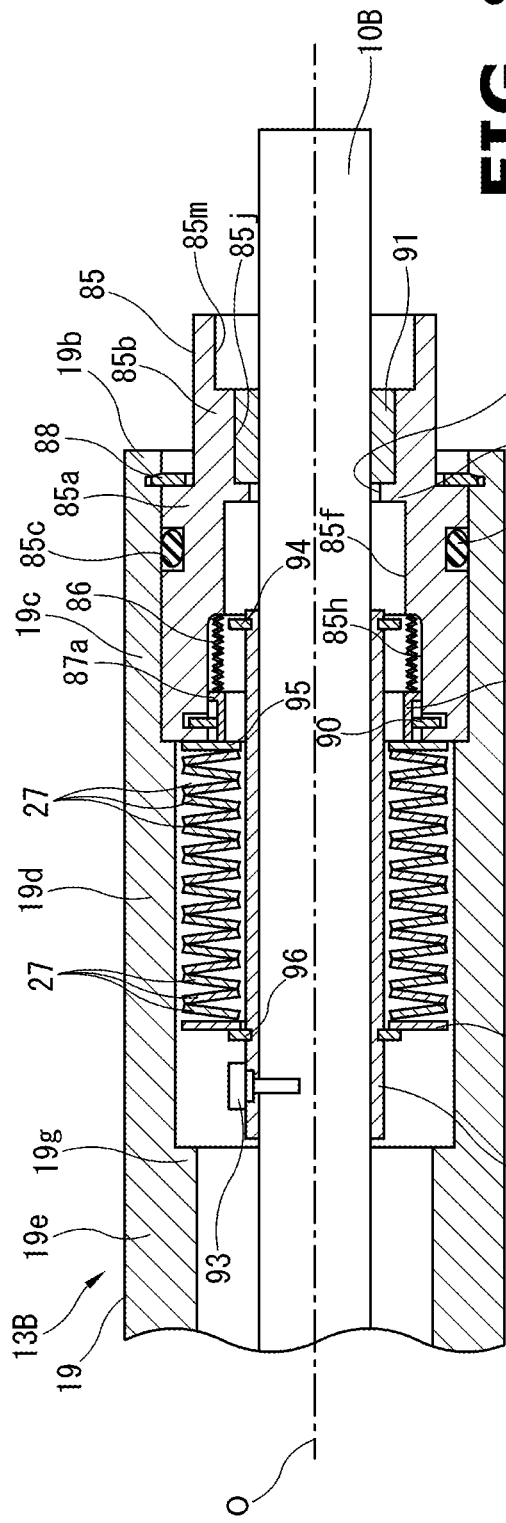
FIG. 8A is a partial longitudinal sectional view of the cylindrical tubular part and others, showing the series of disc springs when the rear wheels are steered maximally to a first longitudinal end of the cylindrical tubular part.
Figure 8B:
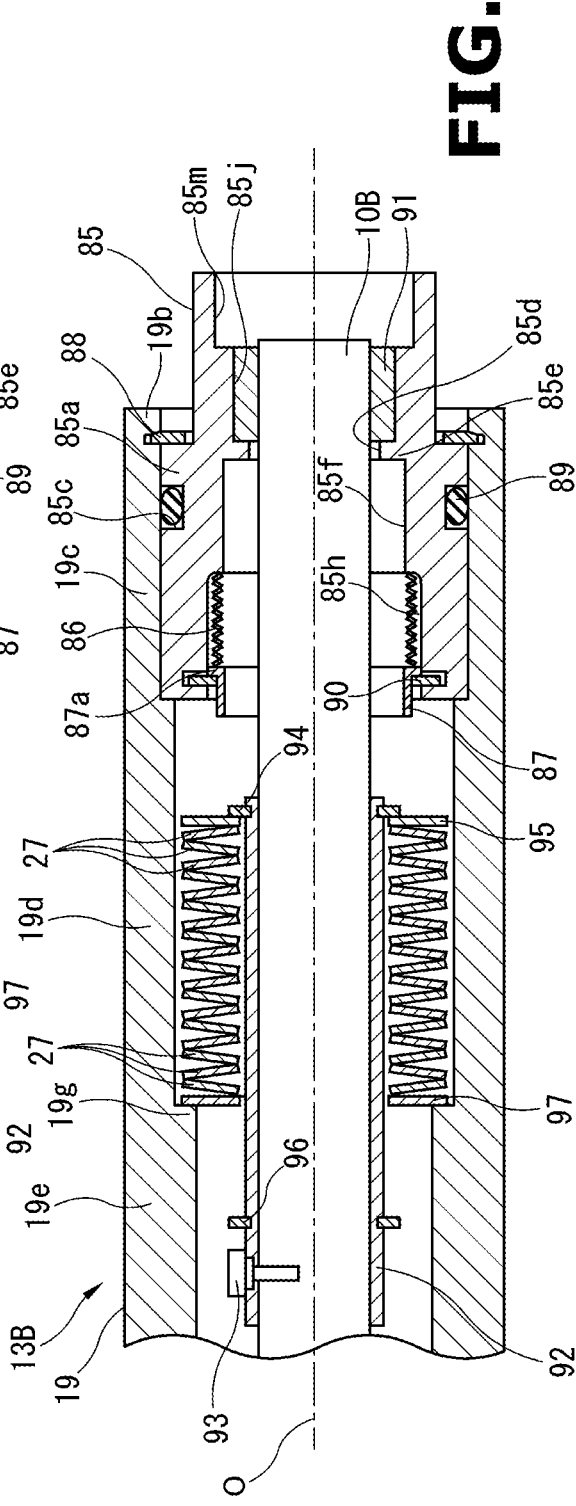
FIG. 8B is a partial longitudinal sectional view of the cylindrical tubular part and others, showing the series of disc springs when the rear wheels are steered maximally to a second longitudinal end of the cylindrical tubular part.

FIG. 7 is a partial longitudinal sectional view of the cylindrical tubular part 19 of the rack bar housing 13B and others, showing a series of disc springs 27 when the rear wheels 5B, 5B are in the neutral position. FIG. 8A is a partial longitudinal sectional view of the cylindrical tubular part 19 and others, showing the series of disc springs 27 when the rear wheels 5B, 5B are steered maximally toward the first axial end 19*b* of the cylindrical tubular part 19. FIG. 8B is a partial longitudinal sectional view of the cylindrical tubular part 19 and others, showing the series of disc springs 27 when the rear wheels 5B, 5B are steered maximally toward the second axial end 19*b* of the cylindrical tubular part 19.

The cylindrical tubular part 19 includes: a large diameter portion 19*c* located at the first axial end 19*b*; a medium diameter portion 19*d* adjacent to the large diameter portion 19*c* in the axial direction and formed to have a smaller diameter than the large diameter portion 19*c*; and a small diameter portion 19*e* adjacent to the medium diameter portion 19*d* in the axial direction and formed to have a smaller diameter than the medium diameter portion 19*d*.

Inside the large diameter portion 19*c*, the following are accommodated: a connecting member 85 for connecting the rack bar 10B and the cylindrical tubular part 19; and a wave spring 86 compressed in accordance with a biasing force from the series of disc springs (return spring) 27 described below; and a transmission member 87 that transmits the biasing force from the series of disc springs 27 to the wave spring 86.

The connecting member 85 has a cylindrical shape, and includes: a large cylindrical portion 85a having an outer diameter corresponding to the inner diameter of the large diameter portion 19c; and a small cylindrical portion 85b formed integrally with the large cylindrical portion 85a, and having a smaller diameter than the large cylindrical portion 85a.

The large cylindrical portion 85a is inserted into the large diameter portion 19c and is made to abut on a first step portion 19f between the large diameter portion 19c and the medium diameter portion 19d, and is pressed toward the second axial end side by a retaining ring 88 provided to the inner periphery of the large diameter portion 19c, and is thereby attached to the inner peripheral surface of the large diameter portion 19c. The outer periphery of the large cylindrical portion 85a is formed with an annular seal member accommodation recess 85c. An annular fourth sealing member 89 is arranged in the sealing member accommodating recess 85c, wherein the fourth sealing member 89 is formed of rubber or the like and hermetically seals between the inner peripheral surface of the large diameter portion 19c and the outer peripheral surface of the large cylindrical portion 85a. Furthermore, the inner peripheral surface of the large cylindrical portion 85a includes: a first inner peripheral surface 85d formed to have a diameter larger than the outer diameter of the rack bar 10B; a second inner peripheral surface 85f connected to the first inner peripheral surface 85d via a first step portion 85e, and formed to have a larger diameter than the first inner peripheral surface 85d; and a third inner peripheral surface 85h connected to the second inner peripheral surface 85f via a second step portion 85g, and formed to have a larger diameter than the second inner peripheral surface 85f. Inside the third inner peripheral surface 85h, an annular member accommodation groove 85i recessed with respect to the third inner peripheral surface 85h is formed at a position close to the series of disc springs 27. An annular member 90 is arranged in the annular member accommodation groove 85i, for slidably holding the outer peripheral surface of the transmission member 87.

The small cylindrical portion 85b includes: a fourth inner peripheral surface 85j having a larger diameter than the first inner peripheral surface 85d of the large cylindrical portion 85a; and a fifth inner peripheral surface 85m formed to have a larger diameter than the inner peripheral surface 85j, and connected to the fourth inner peripheral surface 85j via a third step portion 85k. A cylindrical rack bar holding member 91 is provided between the fourth inner peripheral surface 85j and the outer peripheral surface of the rack bar 10B, for slidably holding the rack bar 10B.

The wave spring 86 is provided in a compressed state inside the third inner peripheral surface 85h of the large cylindrical portion 85a, and includes a first end connected to the second stage portion 85g, and a second end connected to an axial end portion of the transmission member 87.

The transmission member 87 is formed in a cylindrical shape having a smaller diameter than the third inner peripheral surface 85h. The transmission member 87 has an annular protruding end portion 87a that projects radially outward from the outer peripheral surface of the first axial end portion of the transmission member 87. The annular protruding end portion 87a is in sliding contact with the third inner peripheral surface 85h.

Furthermore, the rack bar 10B is inserted into a cylindrical tube member 92. The tube member 92 is press-fitted and attached to the outer peripheral surface of the rack bar 10B by a pin 93. When the rack bar 10B is located as shown in FIG. 7, the tubular member 92 straddles a part of an axial region of the small diameter portion 19e, an axial region of the medium diameter portion 19d, and a part of an axial region of the large diameter portion 19c, continuously extending in the direction of the rotation axis O of the rack bar 10B. The outer peripheral surface of the tubular member 92 is formed with an annular first groove recess 92a at a position near the second axial end of the transmission member 87, wherein a second retaining ring 94 is arranged in the first groove recess 92a. A first washer 95 is provided at a position adjacent to the second axial end face of the second retaining ring 94 in the axial direction. The first axial end face of the first washer 95 is in contact with the second axial end face of the second retaining ring 94 and the second axial end face of the transmission member 87. The first axial end face of the first washer 95 and the face of the large cylindrical portion 85a facing the first washer 95 are separated from each other via a slight axial gap. Furthermore, the outer peripheral surface of the tubular member 92 is formed with a second groove recess 92b in which a third retaining ring 96 is arranged, wherein the second groove recess 92b is in a position that overlaps with a second step portion 19g between the medium diameter portion 19d and the small diameter portion 19e as viewed in the radial direction. A second washer 97 is provided at a position adjacent to the first axial end face of the third retaining ring 96 in the axial direction. The second axial end face of the second washer 97 is in contact with the first axial end face of the third retaining ring 96 and the second step portion 19g.

The disc springs 27 are arranged between the first washer 95 and the second washer 97 such that the attitude of inclination of each disc spring 27 is staggered along the axial direction. The series of disc springs 27 arranged in the axial direction are set between the first washer 95 and the second washer 97 with a preload set as a whole. The series of disc springs 27 are configured to bias the rack bar 10B so that the rear wheels 5B, 5B return to the neutral position when the power supply of the electric motor 14B is lost. Namely, when the power supply fails, the series of disc springs 27 serves to return the rack bar 10B from the position shown in FIG. 8A or 8B described below to the position shown in FIG. 7 in which the rear wheels 5B, 5B are returned to the neutral position. In this description, "neutral position" is a center position of the rear wheels 5B, 5B, namely, a position where the rear wheels 5B, 5B face straight in the longitudinal direction of the vehicle. The return of the rear wheels 5B, 5B to the neutral position does not mean that the rear wheels 5B, 5B return to the neutral position completely. The return of the rear wheels 5B, 5B to the neutral position means that the rear wheels 5B, 5B get closer to the neutral position.

As shown in FIG. 8A, when the rear wheels 5B, 5B are steered maximally to the axial end 19b side of the cylindrical tubular part 19, the second washer 97 moves to the axial end 19b side together with the rack bar 10B, and causes the series of disc springs 27 to be compressed toward the axial end 19b side. With this compression, the first washer 95 is pressed against the end face of the large cylindrical portion 85a facing the first washer 95, so that the transmission member 87 compresses the wave spring 86 toward the first axial end 19b.

Furthermore, as shown in FIG. 8B, when the rear wheels 5B, 5B are steered maximally to the second axial end side of the cylindrical tubular part 19, the first washer 95 moves to the second axial end side together with the rack bar 10B, and causes the series of disc springs 27 to be compressed toward the second axial end side. With this compression, the first washer 95 is separated from the transmission member 87 in the axial direction, so that the transmission member 87 moves toward the second axial end side until the annular protruding end portion 87a abuts on the annular member 90 due to the restoring force of the wave spring 86.

<Effects by First Embodiment> According to the first embodiment, the steering control device is exemplified to include: the actuator structured to generate a steering force to steer the rear wheels 5B, 5B; the rack bar 10B structured to transmit the steering force to the steering shaft 8B; the electromagnetic clutch 34 structured to generate a braking force to inhibit steering of the rack bar 10B when the rack bar 10B is in an arbitrary steering position; and the control device 15 configured to control the electromagnetic clutch 34. Furthermore, the actuator is the electric motor 14B including the motor housing 29, the rotor 31, and the first and second stator coils 73A, 73B; the electromagnetic clutch 34 includes the armature 61 and the clutch plate 62; the armature 61 is connected to the motor housing 29; the clutch plate 62 is connected to the rotor 31; and the armature 61 and the clutch plate 62 are structured to engage with each other to inhibit rotation of the rotor 31 with respect to the motor housing 29. Specifically, when the power of the electric motor 14B fails, the armature 61 engages with the brake lining 71 of the clutch plate 62 by the biasing force of the coil springs 63, so that rotation of the rotor 31 with respect to the motor housing 29 is inhibited. This inhibits steering of the rack bar 10B via the motor shaft 32, the worm shaft 25, and the steering shaft 8B. Therefore, when the power of the electric motor 14B is lost and a steering abnormality occurs in the rear wheels 5B, 5B, a braking force can be quickly generated when the rack bar 10B is located at an arbitrary steering position in the axial direction of the rack bar 10B, thereby stabilizing behavior of the rear wheels 5B, 5B early.

Furthermore, in the present embodiment, the electric motor 14B further includes: the motor shaft 32 connected to the rotor 31; and the sensor magnet 48 connected to the motor shaft 32; the control device 15 includes: the microprocessor; the first board 49 on which the microprocessor is mounted; and the sensor IC 50 mounted on the first board 49 and structured to sense a change in a magnetic field of the sensor magnet 48; and the first board 49, the sensor IC 50, the sensor magnet 48, the electromagnetic clutch 34, and the rotor 31 are arranged in an order of the first board 49, the sensor IC 50, the sensor magnet 48, the rotor 31, and the electromagnetic clutch 34 in the direction of the rotation axis O of the motor shaft 32.

Specifically, the sensor IC 50, which is likely to be affected by magnetism, is arranged to be apart from the electromagnetic clutch 34 by a relatively long axial distance via the sensor magnet 48 and the rotor 31. This serves to suppress magnetic influences on the sensor IC 50, and allow the electric motor 14B to be operated stably.

Furthermore, in the present embodiment, the clutch is the electromagnetic clutch 34; the electromagnetic clutch 34 includes the clutch plate 62, the armature 61, and the exciting coil 60; the clutch plate 62 is connected to the motor shaft 32 and plate-shaped; the armature 61 is structured to: be detached from the clutch plate 62 when the armature 61 is attracted to the exciting coil 60 by a magnetic force generated by the exciting coil 60; and engage with the clutch plate 62 so as to inhibit rotation of the rotor 31 with respect to the motor housing 29 when the armature 61 is not attracted to the exciting coil 60; and the rotor 31, the clutch plate 62, the armature 61, and the exciting coil 60 are arranged in an order of the rotor 31, the clutch plate 62, the armature 61, and the exciting coil 60 in the direction of the rotation axis O of the motor shaft 32.

If the exciting coil 60 is arranged between the clutch plate 62 and the rotor 31, there is a possibility that the harness 55 for feeding the exciting coil 60 interferes with the stator 30 disposed around the rotor 31 where the harness 55 is bent inward in the radial direction.

However, the arrangement of the rotor 31, the clutch plate 62, the armature 61, and the exciting coil 60 in this order according to the present embodiment, allows the harness 55 to be arranged substantially linearly along the axial direction wherein the harness 55 passes through the guide groove formed in the inner peripheral surface of the housing tubular member 35 of the motor housing 29. This serves to enhance the flexibility of layout of the harness 55, and avoid interference between the harness 55 and the stator 30 or the clutch plate 62.

Furthermore, in the present embodiment, the steering control device further includes the second bearing 44 structured to bear the motor shaft 32, wherein the second bearing 44 and the exciting coil 60 overlap with each other as viewed in the radial direction regarding the rotation axis O of the motor shaft 32.

The overlap between the second bearing 44 and the exciting coil 60 as viewed in the radial direction, serves to make it possible to reduce the axial dimension of the electric motor 14B and the axial dimension of the whole steering control device.

Furthermore, in the present embodiment, the armature 61 and the clutch plate 62 of the clutch are structured to engage with each other when the armature 61 and the clutch plate 62 are in arbitrary rotational positions with respect to each other.

Therefore, when the power of the electric motor 14B is lost, the armature 61 and the clutch plate 62 can be immediately engaged so as to inhibit the steering of the rack bar 10B early when the rear wheels 5B, 5B are in any steering position.

Furthermore, in the present embodiment, the electric motor 14B includes the motor shaft 32 connected to the rotor 31; the clutch is the electromagnetic clutch 34; the electromagnetic clutch 34 includes the clutch plate 62, the armature 61, the exciting coil 60, and the coil springs 63; the clutch plate 62 is connected to the motor shaft 32 and plate-shaped; the armature 61 is structured to: be detached from the clutch plate 62 when the armature 61 is attracted to the exciting coil 60 by a magnetic force generated by the exciting coil 60; and engage with the clutch plate 62 by being biased toward the clutch plate 62 by the coil springs 63 so as to inhibit rotation of the rotor 31 with respect to the motor housing 29 when the armature 61 is not attracted to the exciting coil 60; and the coil springs 63 are arranged circumferentially around the rotation axis O of the motor shaft 32.

The coil spring 63 is a biasing member whose spring characteristics do not change with time as compared with a disc spring. Therefore, the arrangement of the coil springs 63 in the circumferential direction, serves to bias the armature 61 in a well-balanced manner for a long period of time as compared with a case where a disc spring is employed.

Furthermore, in the present embodiment, the clutch is the electromagnetic clutch 34.

Therefore, by adjusting the fastening force of the electromagnetic clutch 34 by appropriately setting the spring characteristics of the coil springs 63, it is possible to suppress a shock caused by engagement of the electromagnetic clutch 34, and thereby suppress a driver from feeling uncomfortable during steering Furthermore, in the present embodiment, the electromagnetic clutch 34 is configured to: release engagement between the armature 61 and the clutch plate 62, when the electromagnetic clutch 34 is supplied with electric power; and cause the armature 61 and the clutch plate 62 to engage with each other, when the electromagnetic clutch 34 is supplied with no electric power.

Therefore, it is possible to stabilize behavior of the rear wheels 5B, 5B when the power supply of the electric motor 14B is lost and the drive control of the electric motor 14B is not performed and the steering control is impossible. Furthermore, the control device 15 includes the power supply circuit 79 configured to supply electric power to the electric motor 14B; and the electromagnetic clutch 34 is configured to be supplied with electric power from the power supply circuit 79.

By using the power supply circuit 79, which supplies electric power to the electromagnetic clutch 34, also for the electric motor 14B in this way, the steering control device can be simplified.

Furthermore, in the present embodiment, the steering control device further includes the disc springs 27, wherein the disc springs 27 are structured to bias the rack bar 10B so as to cause the rear wheels 5B, 5B to return to the neutral position of the rear wheels 5B, 5B.

Specifically, the disc springs 27 are configured as a series of disc springs 27 by being arranged in the axial direction, and when the power supply of the electric motor 14B is lost, biases the rack bar 10B by the restoring force so as to cause the rear wheels 5B, 5B to return to the neutral position. Accordingly, when the power of the electric motor 14B fails, the rear wheels 5B, 5B can be restored to the neutral position by the restoring force of the series of disc springs 27 without additional electric power supply from the power supply, wherein the series of disc springs 27 have a relatively simple configuration.

Figure 9:
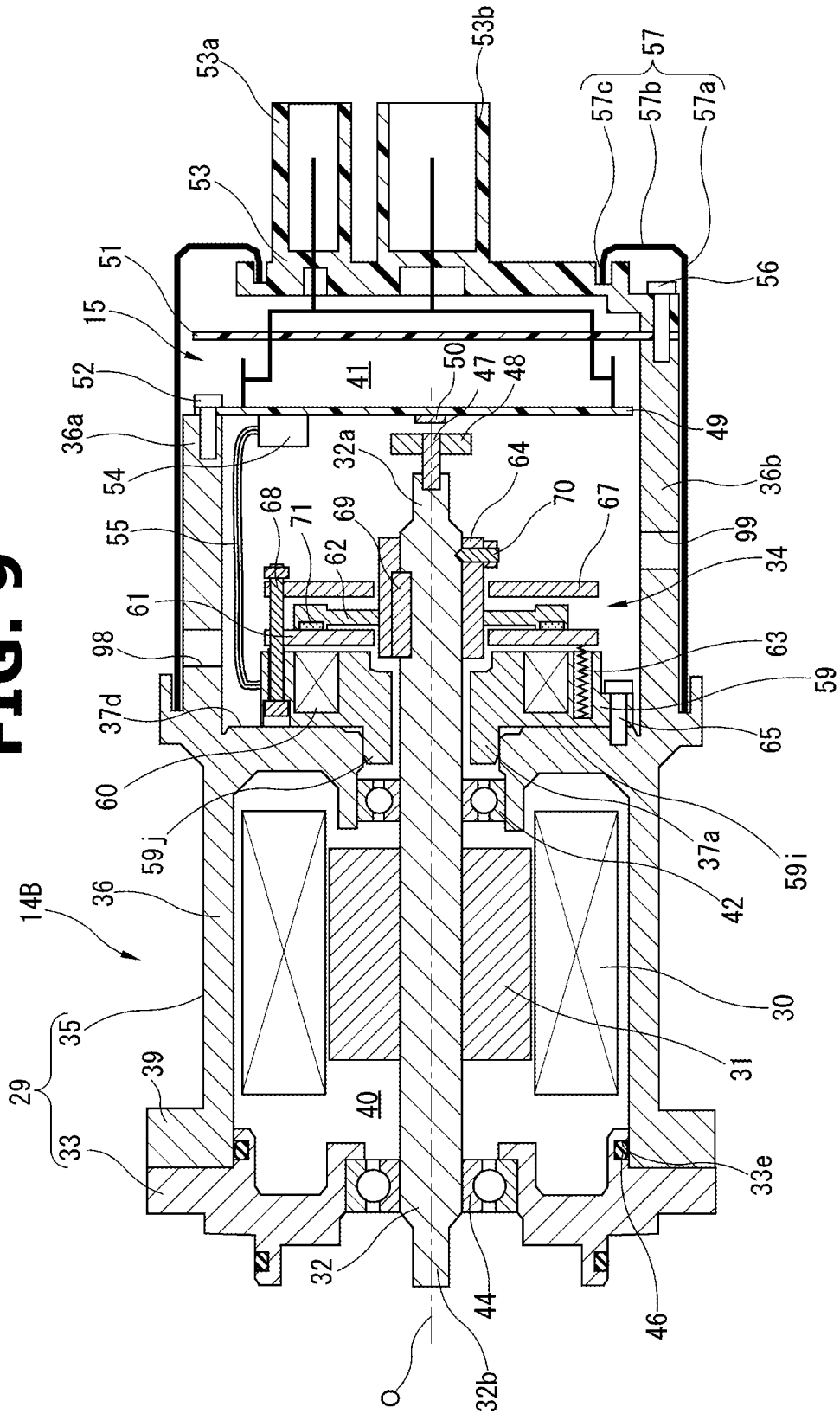
FIG. 9 is a longitudinal sectional view of an electric motor according to a second embodiment.

<Second Embodiment> FIG. 9 is a longitudinal sectional view of the electric motor 14B according to a second embodiment.

In the second embodiment, the electromagnetic clutch 34 is not housed in the motor housing space 40, but is housed in the control device housing space 41.

The coil holding part 59 of the electromagnetic clutch 34 includes an annular protrusion 59j at a position adjacent to the motor shaft 32 in the radial direction, wherein the annular protrusion 59j protrudes in the direction of the rotation axis O from the a back face 59i of the coil holding part 59 toward the first bearing 42. The annular protrusion 59j includes an outer peripheral surface fitted in the partition wall portion through hole 37a. Furthermore, the coil holding part 59 is arranged such that the back face 59i of the coil holding part 59 abuts on the outer face 37d of the partition wall part 37, and the coil holding part 59 is attached and fixed to the partition wall part 37 at the outer peripheral portion of the coil holding part 59 via a bolt 65.

The first axial end portion 36a of the tubular part 36 is formed with a check hole 98 at a position that overlaps with the armature 61 as viewed in the radial direction, for visually checking from the outside of the tubular part 36 an air gap between the armature 61 and the clutch plate 62, which are separated from each other when the exciting coil 60 is energized, wherein the check hole 98 extends through the first axial end portion 36a in the radial direction.

Furthermore, the second axial end portion 36b of the tubular part 36 is formed with a fastening hole 99 at a position that overlaps with the screw member 70 for mounting the clutch plate mounting member 64 as viewed in the radial direction, for fastening the screw member 70, wherein the fastening hole 99 extends through the second axial end portion 36b in the radial direction. The fastening hole 99 is set to have a size such that a jig not shown for fastening the screw member 70 can be inserted into the fastening hole 99.

In the control device 15 and the electric motor 14B described above, in the direction of the rotation axis O of the motor shaft 32, the first board 49, the sensor IC 50, the sensor magnet 48, the electromagnetic clutch 34, and the rotor 31 are arranged in this order from the second enclosing member 53 side to the first enclosing member 33 side.

<Effects by Second Embodiment> In the second embodiment, the electric motor 14B further includes: the motor shaft 32 connected to the rotor 31; and the sensor magnet 48 connected to the motor shaft 32; the control device 15 includes: the microprocessor; the first board 49 on which the microprocessor is mounted; and the sensor IC 50 mounted on the first board 49 and structured to sense a change in a magnetic field of the sensor magnet 48; and the first board 49, the sensor IC 50, the sensor magnet 48, the electromagnetic clutch 34, and the rotor 31 are arranged in an order of the first board 49, the sensor IC 50, the sensor magnet 48, the electromagnetic clutch 34, and the rotor 31 in the direction of the rotation axis O of the motor shaft 32.

Specifically, in the first embodiment, the harness 55 is connected from the first board 49 to the exciting coil 60 of the electromagnetic clutch 34 located behind the rotor 31, but in the second embodiment, the harness 55 is connected from the first board 49 to the exciting coil 60 on the front side of the rotor 31. Therefore, as compared with the harness 55 according to the first embodiment, the length of the harness 55 according to the second embodiment can be shortened, so that the electrical connection between the exciting coil 60 and the first board 49 can be inexpensively implemented.

Figure 10:
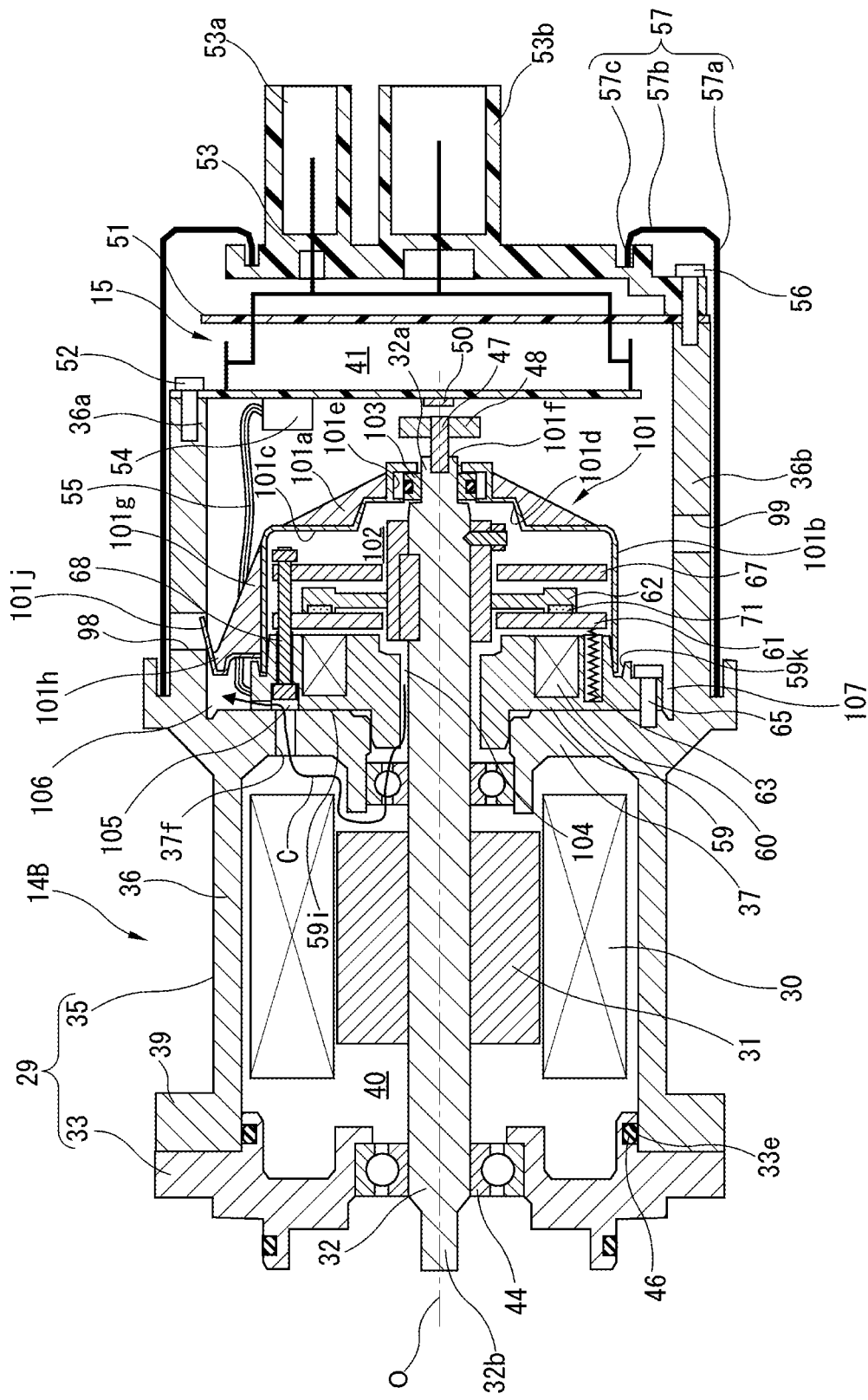
FIG. 10 is a longitudinal sectional view of an electric motor according to a third embodiment.

<Third Embodiment> FIG. 10 is a longitudinal sectional view of the electric motor 14B according to a third embodiment.

The electromagnetic clutch 34 according to the third embodiment is configured by putting a third cover member 101 over the electromagnetic clutch 34 according to the second embodiment, wherein the third cover member 101 serves as a partition wall separating the first board 49 and the electromagnetic clutch 34 from each other and functions as a lid member for covering the electromagnetic clutch 34.

The third cover member 101 is formed of a synthetic resin material into a cup shape. The third cover member 101 is arranged between the partition wall part 37 and the first board 49 in the control device accommodation space 41 so as to cover the guide support member 67, the clutch plate 62, the armature 61, etc. from the first board 49 side. The space covered by the third cover member 101 forms an electromagnetic clutch accommodation space 102 that accommodates the armature 61 of the electromagnetic clutch 34 and others. The third cover member 101 includes: a bottom portion 101a having a truncated cone shape that decreases in diameter toward the first board 49 side; and a tubular peripheral wall portion 101b that rises from the outer peripheral edge portion of the bottom portion 101a toward the coil holding part 59 side.

The bottom portion 101a has an inside surface 101c facing the guide support member 67, wherein the inside surface 101c includes a circular recessed portion 101d in its central portion. At the center of the bottom surface of the recessed portion 101d, a seal mounting recess 101e is formed with respect to the bottom surface. The seal mounting recess 101e includes a bottom wall formed with a bottom wall through hole 101f through which the motor shaft 32 extends. In the seal mounting recess 101e, an annular third seal member 103 is provided to suppress an outflow of wear debris from the brake lining 71 to the outside of the third cover member 101 via the gap between the outer periphery of the motor shaft 32 and the bottom wall through hole 101f.

Furthermore, the tip portion of the peripheral wall portion 101b is inserted into an annular circumferential groove 59k formed in the outer peripheral portion of the coil holding part 59, and is fixed to the coil holding part 59 by filling a potting material not shown in the peripheral groove 59k, wherein the potting material is made of urethane resin or the like.

The outer peripheral surface of the peripheral wall portion 101b is formed integrally with an overhanging portion 101g at a position facing the check hole 98, wherein the overhanging portion 101g overhangs to the check hole 98 side. As shown in FIG. 10, the cross section of the overhanging portion 101g along the rotation axis O of the motor shaft 32 has a triangular shape with a width in the radial direction which gradually decreases toward the first board 49. The overhanging portion 101g is formed with a through hole not shown through which the harness 55 passes in the direction of the rotation axis O of the motor shaft 32. Furthermore, the overhanging portion 101g includes an outermost portion 101h formed integrally with a snap-fit portion 101j that projects from the outermost portion 101h into the check hole 98. The snap-fit portion 101j is configured to be elastically deformable in the radial direction, and is elastically in contact with the edge of the check hole 98 open to the control device accommodation space 41.

Furthermore, the partition wall part 37 is formed with a communication hole 37f at a position facing the guide member 68, wherein the communication hole 37f extends in the direction of the rotation axis O of the motor shaft 32, and communicates the motor accommodation space 40 with a space 105 described below of the coil holding part 59, When the internal pressure of the electromagnetic clutch accommodation space 102 rises due to factors such as heat generation resulting from energization of the electromagnetic clutch 34, high-pressure air in the electromagnetic clutch accommodation space 102 is guided into the communication hole 37f via a gap 104 between the outer periphery of the motor shaft 32 and the inner periphery of the coil holding part 59, and the motor accommodation space 40, as indicated by an arrow C in FIG. 10. The high-pressure air guided to the communication hole 37f is guided through the space 105 to a space 106 adjacent to the outer periphery of the coil holding part 59, wherein the space 105 is formed on the back face 591 of the coil holding part 59. Then, the air guided to the space 106 flows along the outer periphery of the coil holding part 59 to a space 107 on the opposite side in the circumferential direction, and is released into the control device accommodation space 41 being relatively large.

<Effects by Third Embodiment> In the third embodiment, the steering control device further includes the third cover member 101 disposed between the first board 49 and the electromagnetic clutch 34.

Therefore, wear debris from the brake lining 71 of the clutch plate 62 is blocked by the third cover member 101, so that it becomes difficult for the wear debris to flow out to the first board 49. Therefore, it is possible to suppress failure of the first board 49 due to wear debris, specifically, failure of electric components such as the sensor IC50 mounted on the first board 49.

Figure 11:
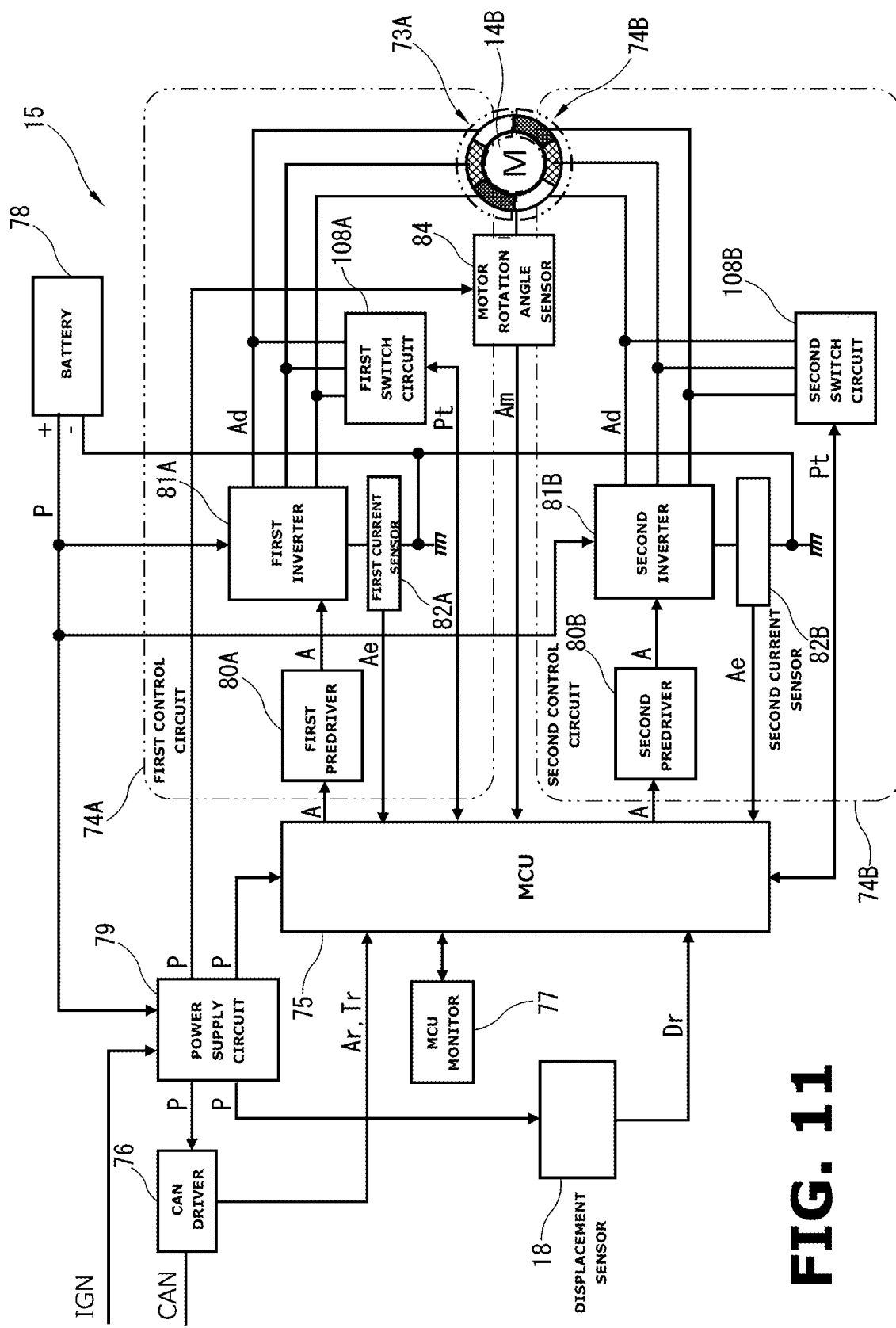
FIG. 11 is a system block diagram of a control device according to a fourth embodiment.
Figure 12:
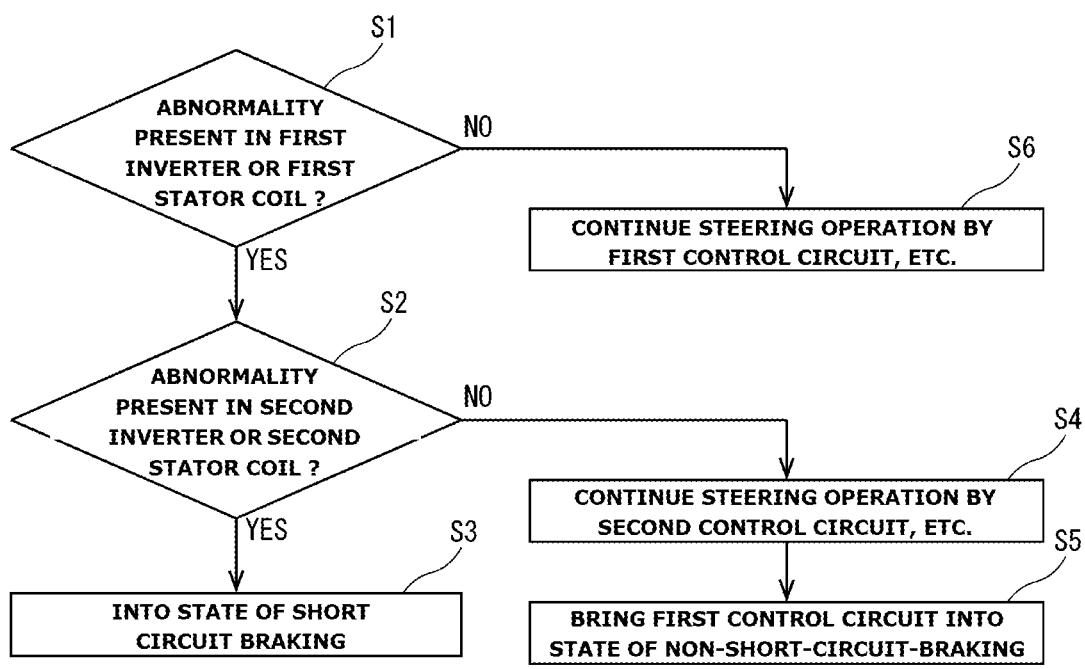
FIG. 12 is a first flowchart showing a procedure of determination about abnormality of a first inverter and others.
Figure 13:
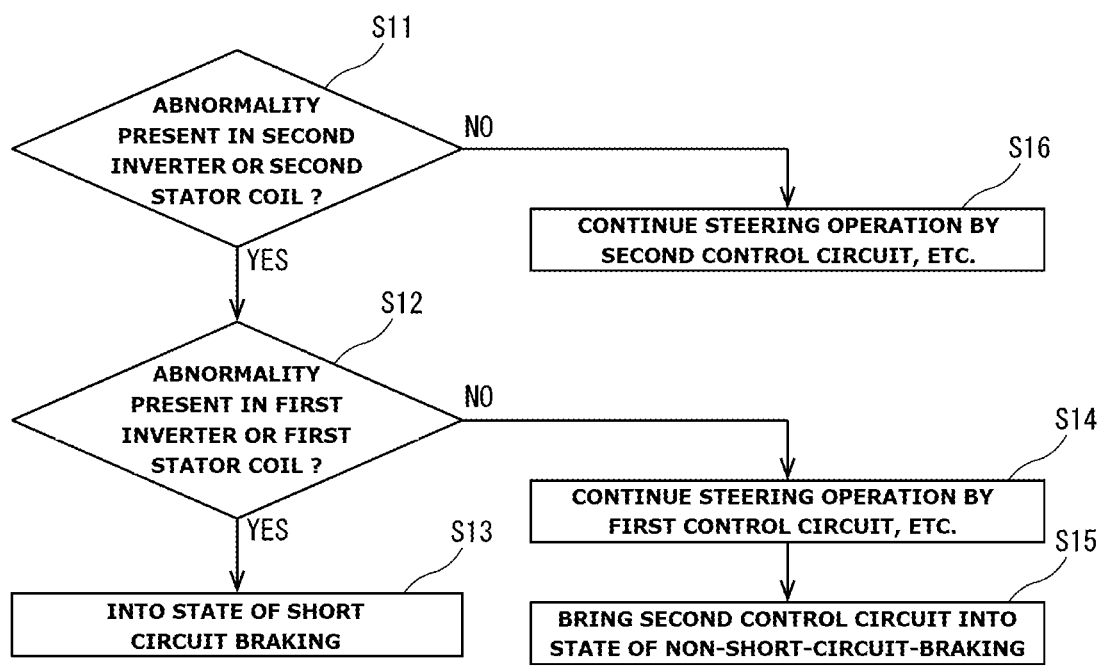
FIG. 13 is a second flowchart showing a procedure of determination about abnormality of the first inverter and others.

<Fourth Embodiment> FIG. 11 is a system block diagram of a control device 15 according to a fourth embodiment. FIG. 12 is a first flowchart showing a procedure of determination about abnormality of the first inverter 81A and others. FIG. 13 is a second flowchart showing a procedure of determination about abnormality of the first inverter 81A and others.

In the fourth embodiment, the electric motor 14B is used as the braking mechanism. Specifically, the control device 15, which is configured integrally with the electric motor 14B, includes a short circuit braking control section described below, wherein the short circuit braking control section performs short circuit braking. When an abnormality determination section described below of the control device 15 determines that the electric motor 14B has an abnormality, short circuit braking is performed wherein the short circuit braking control section controls the first control circuit 74A and the second control circuit 74B into a state of short circuit braking.

In FIG. 11, the first and second phase potential sensing sections 83A, 83B in the system block diagram of the control device 15 in FIG. 6 are replaced with first and second switch circuits 108A, 108B. In the present embodiment, the replacement is made to show the first and second switch circuits 108A, 108B as characterizing parts of the present embodiment, but in addition to the first and second switch circuits 108A, 108B, the first and second phase potential sensing sections 83A, 83B of FIG. 6 may be employed.

The control device 15 includes: the first switch circuit 108A connected between the first inverter 81A and the electric motor 14B in the first control circuit 74A; and the second switch circuit 108B connected between the second inverter 81B and the electric motor 14B in the second control circuit 74B. The first and second switch circuits 108A, 108B are similarly configured, and each have three switching elements, such as field effect transistors (FETs), for switching the U-phase, V-phase, and W-phase on and off, respectively. The first and second switch circuits 108A, 108B cause short circuit braking by turning off each field-effect transistor and thereby short-circuiting the first and second stator coils 73A, 73B when the electric motor 14B is abnormal. In order to adjust the intensity of short circuit braking, the first and second switch circuits 108A, 108B may be provided with a resistance.

Furthermore, the microprocessor of the control device 15 includes an abnormality determination section not shown, a short circuit braking control section not shown, and a steering angle information transmission section not shown. The abnormality determination section determines whether or not an abnormality is present in the first inverter 81A, the second inverter 81B, the first stator coil 73A, and the second stator coil 73B. The short circuit braking control section controls the first control circuit 74A and the second control circuit 74B into a state of non-short-circuit-braking or a state of short circuit braking based on the presence or absence of an abnormality determined by the abnormality determination section. When the abnormality determination section determines that an abnormality is present in the electric motor 14B, the steering angle information transmission section transmits information about a steering amount of the rear wheels 5B, 5B such as the displacement signal Dr regarding the axial displacement of the rack bar 10B to a front wheel control device not shown for controlling steering of the front wheels 5A, 5A of the vehicle. The information about the steering amount of the rear wheels 5B, 5B may be information about the steering angle of the rear wheels 5B, 5B, or information about a rotation amount of the rotor 31 of the electric motor 14B (motor rotation angle Am), or other information.

The abnormality determination section determines presence or absence of an abnormality in the first inverter 81A and others according to a first flowchart shown in FIG. 12 and a second flowchart shown in FIG. 13. The second flowchart of FIG. 13 corresponds to the first flowchart of FIG. 12 in which Step S1 and Step S2 are exchanged with each other, wherein Steps 14 to 16 are provided with slight changes corresponding to the exchange.

In the flowchart of FIG. 12, at Step S1, the abnormality determination section determines whether or not an abnormality is present in the first inverter 81A or the first stator coil 73A. When no abnormality is present, at Step S6, steering operation is continued by the first control circuit 74A and the first stator coil 73A. When an abnormality is present, at Step S2, the abnormality determination section determines whether or not an abnormality is present in the second inverter 81B or the second stator coil 73B. When an abnormality is present, at Step S3, the short circuit braking control section assumes that it is determined by the abnormality determination section that an abnormality is present in the electric motor 14B, and brings the first and second control circuits 74A, 74B into a state of short circuit braking in which short circuit braking is caused by the first and second stator coils 73A, 73B. Accordingly, rotation of the electric motor 14B is decelerated, so that the steering speed of the rack bar 10B connected to the electric motor 14B via the motor shaft 32 and others is also decelerated. Furthermore, when the electric motor 14B is abnormal, the rack bar 10B is biased by the series of disc springs 27 described above so that the rear wheels 5B, 5B return to the neutral position.

When no abnormality is present at Step S2, at Step S4, steering control is continued by the second control circuit 74B and the second stator coil 73B. Then, the process proceeds to Step S5, where the first control circuit 74A is put into a state of non-short-circuit-braking in which no short circuit braking is caused by the first stator coil 73A.

At Step S1, it may be determined that an abnormality is present, when an abnormality is present in each of the first inverter 81A and the first stator coil 73A. Similarly, at Step S2, it may be determined that an abnormality is present, when an abnormality is present in each of the second inverter 81B and the second stator coil 73B.

Furthermore, in the flowchart of FIG. 13, at Step S11, the abnormality determination section determines whether or not an abnormality is present in the second inverter 81B or the second stator coil 73B. When no abnormality is present, at Step S16, steering operation is continued by the second control circuit 74B and the second stator coil 73B. When an abnormality is present, at Step S12, the abnormality determination section determines whether or not an abnormality is present in the first inverter 81A or the first stator coil 73A. When an abnormality is present, at Step S13, the short circuit braking control section assumes that it is determined by the abnormality determination section that an abnormality is present in the electric motor 14B, and brings the first and second control circuits 74A, 74B in to a state of short circuit braking in which short circuit braking is caused by the first and second stator coils 73A, 73B. Accordingly, rotation of the electric motor 14B is decelerated, so that the steering speed of the rack bar 10B connected to the electric motor 14B via the motor shaft 32 and others is also decelerated. Furthermore, when the electric motor 14B is abnormal, the rack bar 10B is biased by the series of disc springs 27 described above so that the rear wheels 5B, 5B return to the neutral position.

When no abnormality is present at Step S12, at Step S14, steering control is continued by the first control circuit 74A and the first stator coil 73A. Then, the process proceeds to Step S15, where the second control circuit 74B is put into a state of non-short-circuit-braking in which no short circuit braking is caused by the second stator coil 73B.

Furthermore, the short circuit braking control section may be configured to put the first and second control circuits 74A, 74B into the state of short circuit braking in response to shut-off of power supply to the first and second stator coils 73A, 73B.

In the present embodiment, the short circuit braking using the electric motor 14B has been described, but the present invention may be exemplified such that this short circuit braking is combined with the electromagnetic clutch 34 according to the first to third embodiments.

<Effects by Fourth Embodiment> In the fourth embodiment, the steering control device is exemplified to include: the actuator structured to generate a steering force to steer the rear wheels 5B, 5B; the rack bar 10B structured to transmit the steering force to the steering shaft 8B; the braking mechanism structured to generate a braking force to inhibit steering of the rack bar 10B when the rack bar 10B is in an arbitrary steering position; and the control device 15 configured to control the braking mechanism. The braking mechanism is the electric motor 14B. When the electric motor 14B is abnormal, for example, when the first and second inverters 81A, 81B and the first and second stator coils 73A, 73B are abnormal, the control device 15, which is configured integrally with the electric motor 14B, short-circuits the first and second stator coils 73A, 73B by switching of the first and second switch circuits 108A, 108B, thereby causing short circuit braking. As a result, rotation of the electric motor 14B is decelerated, and via the motor shaft 32, the worm shaft, and the steering shaft 8B, the steering speed of the rack bar 10B is also decelerated. Therefore, when the electric motor 14B is abnormal and a steering abnormality occurs in the rear wheels 5B, 5B, it is possible to quickly generate a braking force with the rack bar 10B at an arbitrary steering position in the axial direction, and stabilize behavior of the rear wheels 5B, 5B early.

Furthermore, in the fourth embodiment, the stator coil includes: the first stator coil 73A; and the second stator coil 73B electrically separated from the first stator coil 73A; the control device 15 includes the first control circuit 74A, the second control circuit 74B, and the microprocessor; the first control circuit 74A includes the first inverter 81A; the second control circuit 74B includes the second inverter 81B; the first inverter 81A is configured to control electric power supply to the first stator coil 73A; the second inverter 81B is configured to control electric power supply to the second stator coil 73B; the microprocessor includes the abnormality determination section and the short circuit braking control section; the abnormality determination section is configured to determine whether or not an abnormality is present in the first inverter 81A, the second inverter 81B, the first stator coil 73A, and the second stator coil 73B; and the short circuit braking control section is configured to: when it is determined that an abnormality is present in the first inverter 81A or the first stator coil 73A, and steering control is continued by the second control circuit 74B and the second stator coil 73B, bring the first control circuit 74A into the state of non-short-circuit-braking in which no short circuit braking is caused by the first stator coil 73A; and when it is determined that an abnormality is present in the second inverter 81B or the second stator coil 73B, and steering control is continued by the first control circuit 74A and the first stator coil 73A, bring the second control circuit 74B into the state of non-short-circuit-braking in which no short circuit braking is caused by the second stator coil 73B.

Namely, even when it is determined that an abnormality is present in the first inverter 81A or the first stator coil 73A or the second inverter 81B or the second stator coil 73B, steering operation is continued by the inverter and the stator coil in which no abnormality is present, and the control circuit related to the inverter and stator coil in which an abnormality is present is brought into the state of non-short-circuit-braking. This serves to suppress generation of unnecessary short circuit braking, and allow the steering control of the rack bar 10B by the electric motor 14B to be continued.

Furthermore, in the fourth embodiment, the braking mechanism is the electric motor 14B including the rotor 31 and the first and second stator coils 73A, 73B; the control device 15 includes the first and second control circuits 74A, 74B, and the microprocessor; the microprocessor includes the short circuit braking control section; and the short circuit braking control section is configured to bring the first and second control circuits 74A, 74B into the state of short circuit braking in which short circuit braking is caused by the first and second stator coils 73A, 73B.

Therefore, when the electric motor 14B is abnormal, it is possible to generate a braking force at an arbitrary rotational position of the rotor 31, and control the steering of the rack bar 10B at an arbitrary axial position of the rack bar 10B accordingly. Conversely, since it is unnecessary to wait for the electric motor 14B to rotate to a predetermined rotational position and then control the steering of the rack bar 10B at a predetermined axial position of the rack bar 10B, it is possible to stabilize the steering of the rack bar 10B early.

Furthermore, in the fourth embodiment, the short circuit braking control section may be configured to bring the first and second control circuits 74B into the state of short circuit braking, in response to shutoff of electric power supply to the first and second stator coils 73A, 73B.

When the power supply to the first and second stator coils 73A, 73B is shut off, behavior of the rear wheels 5B, 5B is required to be stabilized quickly, because the electric motor 14B and the rack bar 10B driven by the electric motor 14B cannot be normally controlled, Therefore, the behavior of the rear wheels 5B, 5B can be quickly stabilized by immediately causing the state of short circuit braking when the power supply to the first and second stator coils 73A, 73B is shut off.

Furthermore, in the fourth embodiment, the steering control device further includes the disc springs 27, wherein: the disc springs 27 are structured to bias the rack bar 10B so as to cause the rear wheels 5B, 5B to return to the neutral position of the rear wheels 5B, 5B; the electric motor 14B constitutes the actuator; the microprocessor includes the abnormality determination section; the abnormality determination section is configured to determine whether or not an abnormality is present in the electric motor 14B; and the short circuit braking control section is configured to bring the first and second control circuits 74A, 74B into the state of short circuit braking, in response to determination that an abnormality is present in the electric motor 14B.

Specifically, the disc springs 27 are configured as a series of disc springs 27 by being arranged in the axial direction, and when the electric motor 14B is abnormal, the rack bar 10B is biased by the restoring force of the disc springs 27 so that the rear wheels 5B, 5B return to the neutral position. Furthermore, since the short circuit braking acts in the direction opposite to the normal rotation direction of the electric motor 14B, the force applied to the rack bar 10B by the short circuit braking is in the direction of returning the rack bar 10B, namely, returning the rear wheels 5B, 5B to the neutral position. This serves to suppress a sudden change in the steering angle of the rear wheels 5B, 5B, and stabilize the behavior of the rear wheels 5B, 5B.

Furthermore, in the fourth embodiment, the steerable wheels are the rear wheel 5B, 5B of the vehicle; the microprocessor includes the abnormality determination section and the steering angle information sending section; the abnormality determination section is configured to determine whether or not an abnormality is present in the actuator; and the steering angle information sending section is configured to send information about the amount of steering of the rear wheel 5B, 5B to the front wheel control device, in response to determination that an abnormality is present in the actuator, wherein the front wheel control device is configured to control steering of the front wheels 5A, 5A of the vehicle.

Therefore, when an abnormality occurs in the electric motor 14B for the rear wheels 5B, 5B and the rear wheels 5B, 5B cannot be steered, information about the steering amount of the rear wheels 5B, 5B is transmitted to the front wheel control device, and accordingly, the front wheel control device controls the steering of the front wheels in accordance with the information about the steering amount of the rear wheels 5B, 5B. Therefore, when an abnormality occurs in the electric motor 14B for the rear wheels 5B, 5B, the front wheels 5A, 5A are appropriately controlled to compensate for the inability to steer the rear wheels 5B, 5B, thereby achieving a more appropriate steering control for the vehicle as a whole.

The steering control devices according to the embodiments described above may be exemplified as follows.

According to an embodiment, a steering control device includes: an actuator structured to generate a steering force to steer a steerable wheel; a steering member structured to transmit the steering force to a steering shaft; a braking mechanism structured to generate a braking force to inhibit steering of the steering member when the steering member is in an arbitrary steering position; and a control device configured to control the braking mechanism.

According to a preferable embodiment, the steering control device is configured such that: the actuator is an electric motor including a motor housing, a rotor, and a stator coil; the braking mechanism is a clutch including a first clutch member and a second clutch member; the first clutch member is connected to the motor housing; the second clutch member is connected to the rotor; and the first clutch member and the second clutch member are structured to engage with each other to inhibit rotation of the rotor with respect to the motor housing.

According to another preferable embodiment, the steering control device according to one of the foregoing embodiments is configured such that: the electric motor further includes: a motor shaft connected to the rotor; and a sensor magnet connected to the motor shaft; the control device includes: a microprocessor; a board on which the microprocessor is mounted; and a sensor IC mounted on the board and structured to sense a change in a magnetic field of the sensor magnet; and the board, the sensor IC, the sensor magnet, the clutch, and the rotor are arranged in an order of the board, the sensor IC, the sensor magnet, the clutch, and the rotor in a direction of a rotation axis of the motor shaft.

According to another preferable embodiment, the steering control device according to one of the foregoing embodiments is configured such that the steering control device further includes a partition wall disposed between the board and the clutch.

According to another preferable embodiment, the steering control device according to one of the foregoing embodiments is configured such that: the electric motor further includes: a motor shaft connected to the rotor; and a sensor magnet connected to the motor shaft; the control device includes: a microprocessor; a board on which the microprocessor is mounted; and a sensor IC mounted on the board and structured to sense a change in a magnetic field of the sensor magnet; and the board, the sensor IC, the sensor magnet, the clutch, and the rotor are arranged in an order of the board, the sensor IC, the sensor magnet, the rotor, and the clutch in a direction of a rotation axis of the motor shaft.

According to another preferable embodiment, the steering control device according to one of the foregoing embodiments is configured such that: the clutch is an electromagnetic clutch; the electromagnetic clutch includes a clutch plate, an armature, and an exciting coil; the clutch plate is connected to the motor shaft and plate-shaped; the armature is structured to: be detached from the clutch plate when the armature is attracted to the exciting coil by a magnetic force generated by the exciting coil; and engage with the clutch plate so as to inhibit rotation of the rotor with respect to the motor housing when the armature is not attracted to the exciting coil; and the rotor, the clutch plate, the armature, and the exciting coil are arranged in an order of the rotor, the clutch plate, the armature, and the exciting coil in the direction of the rotation axis of the motor shaft.

According to another preferable embodiment, the steering control device according to one of the foregoing embodiments is configured such that the steering control device further includes a bearing structured to bear the motor shaft, wherein the bearing and the exciting coil overlap with each other as viewed in a radial direction regarding the rotation axis of the motor shaft.

According to another preferable embodiment, the steering control device according to one of the foregoing embodiments is configured such that the first clutch member and the second clutch member of the clutch are structured to engage with each other when the first clutch member and the second clutch member are in arbitrary rotational positions with respect to each other.

According to another preferable embodiment, the steering control device according to one of the foregoing embodiments is configured such that: the electric motor includes a motor shaft connected to the rotor; the clutch is an electromagnetic clutch; the electromagnetic clutch includes a clutch plate, an armature, an exciting coil, and coil springs; the clutch plate is connected to the motor shaft and plate-shaped; the armature is structured to: be detached from the clutch plate when the armature is attracted to the exciting coil by a magnetic force generated by the exciting coil; and engage with the clutch plate by being biased toward the clutch plate by the coil springs so as to inhibit rotation of the rotor with respect to the motor housing when the armature is not attracted to the exciting coil; and the coil springs are arranged circumferentially around the rotation axis of the motor shaft.

According to another preferable embodiment, the steering control device according to one of the foregoing embodiments is configured such that: the stator coil includes: a first stator coil; and a second stator coil electrically separated from the first stator coil; the control device includes a first control circuit, a second control circuit, and a microprocessor; the first control circuit includes a first inverter; the second control circuit includes a second inverter; the first inverter is configured to control electric power supply to the first stator coil; the second inverter is configured to control electric power supply to the second stator coil; the microprocessor includes an abnormality determination section and a short circuit braking control section; the abnormality determination section is configured to determine whether or not an abnormality is present in the first inverter, the second inverter, the first stator coil, and the second stator coil; and the short circuit braking control section is configured to: when it is determined that an abnormality is present in the first inverter or the first stator coil, and steering control is continued by the second control circuit and the second stator coil, bring the first control circuit into a state of non-short-circuit-braking in which no short circuit braking is caused by the first stator coil; and when it is determined that an abnormality is present in the second inverter or the second stator coil, and steering control is continued by the first control circuit and the first stator coil, bring the second control circuit into a state of non-short-circuit-braking in which no short circuit braking is caused by the second stator coil.

According to another preferable embodiment, the steering control device according to one of the foregoing embodiments is configured such that the clutch is an electromagnetic clutch.

According to another preferable embodiment, the steering control device according to one of the foregoing embodiments is configured such that the electromagnetic clutch is configured to: release engagement between the first clutch member and the second clutch member, when the electromagnetic clutch is supplied with electric power; and cause the first clutch member and the second clutch member to engage with each other, when the electromagnetic clutch is supplied with no electric power.

According to another preferable embodiment, the steering control device according to one of the foregoing embodiments is configured such that: the control device includes a power supply circuit configured to supply electric power to the electric motor; and the electromagnetic clutch is configured to be supplied with electric power from the power supply circuit.

According to another preferable embodiment, the steering control device according to one of the foregoing embodiments is configured such that: the braking mechanism is an electric motor including a rotor and a stator coil; the control device includes a control circuit and a microprocessor; the microprocessor includes a short circuit braking control section; and the short circuit braking control section is configured to bring the control circuit into a state of short circuit braking in which short circuit braking is caused by the stator coil.

According to another preferable embodiment, the steering control device according to one of the foregoing embodiments is configured such that the short circuit braking control section is configured to bring the control circuit into the state of short circuit braking, in response to shutoff of electric power supply to the stator coil.

According to another preferable embodiment, the steering control device according to one of the foregoing embodiments is configured such that: the clutch is an electromagnetic clutch; the microprocessor includes an abnormality determination section; the abnormality determination section is configured to determine whether or not an abnormality is present in the electric motor; and the short circuit braking control section is configured to bring the control circuit into the state of short circuit braking, when the abnormality determination section determines that an abnormality is present in the electric motor.

According to another preferable embodiment, the steering control device according to one of the foregoing embodiments is configured such that: the stator coil includes: a first stator coil; and a second stator coil electrically separated from the first stator coil; the control device includes a first control circuit and a second control circuit; the first control circuit includes a first inverter; the second control circuit includes a second inverter; the first inverter is configured to control electric power supply to the first stator coil; the second inverter is configured to control electric power supply to the second stator coil; the microprocessor includes an abnormality determination section; the abnormality determination section is configured to determine whether or not an abnormality is present in the first inverter, the second inverter, the first stator coil, and the second stator coil; and the short circuit braking control section is configured to: when it is determined that an abnormality is present in the first inverter or the first stator coil, and steering control is continued by the second control circuit and the second stator coil, bring the first control circuit into a state of non-short-circuit-braking in which no short circuit braking is caused by the first stator coil; and when it is determined that an abnormality is present in the second inverter or the second stator coil, and steering control is continued by the first control circuit and the first stator coil, bring the second control circuit into a state of non-short-circuit-braking in which no short circuit braking is caused by the second stator coil.

According to another preferable embodiment, the steering control device according to one of the foregoing embodiments is configured such that the steering control device further includes a return spring, wherein: the return spring is structured to bias the steering member so as to cause the steerable wheel to return to a neutral position of the steerable wheel; the electric motor constitutes the actuator; the microprocessor includes an abnormality determination section; the abnormality determination section is configured to determine whether or not an abnormality is present in the electric motor; and the short circuit braking control section is configured to bring the control circuit into the state of short circuit braking, in response to determination that an abnormality is present in the electric motor.

According to another preferable embodiment, the steering control device according to one of the foregoing embodiments is configured such that the steering control device further includes a return spring, wherein the return spring is structured to bias the steering member so as to cause the steerable wheel to return to a neutral position of the steerable wheel.

According to another preferable embodiment, the steering control device according to one of the foregoing embodiments is configured such that: the steerable wheel is a rear wheel of a vehicle; the microprocessor includes an abnormality determination section and a steering angle information sending section; the abnormality determination section is configured to determine whether or not an abnormality is present in the actuator; and the steering angle information sending section is configured to send information about an amount of steering of the rear wheel to a front wheel control device, in response to determination that an abnormality is present in the actuator, wherein the front wheel control device is configured to control steering of a front wheel of the vehicle.

The invention claimed is:

1. A steering control device comprising:
an actuator structured to generate a steering force to steer a steerable wheel;
a steering member structured to transmit the steering force to a steering shaft;
a braking mechanism structured to generate a braking force to inhibit steering of the steering member when the steering member is in an arbitrary steering position; and
a control device configured to control the braking mechanism; wherein
the actuator is an electric motor including a motor housing, a rotor, and a stator coil;
the braking mechanism is a clutch including a first clutch member and a second clutch member;
the first clutch member is connected to the motor housing;
the second clutch member is connected to the rotor;
the first clutch member and the second clutch member are structured to engage with each other to inhibit rotation of the rotor with respect to the motor housing;
the electric motor further includes:
a motor shaft connected to the rotor; and
a sensor magnet connected to the motor shaft;
the control device includes:
a microprocessor;
a board on which the microprocessor is mounted; and
a sensor IC mounted on the board and structured to sense a change in a magnetic field of the sensor magnet; and
the board, the sensor IC, the sensor magnet, the clutch, and the rotor are arranged in an order of the board, the sensor IC, the sensor magnet, the clutch, and the rotor in a direction of a rotation axis of the motor shaft.

2. The steering control device as claimed in claim 1, further comprising a partition wall disposed between the board and the clutch.

3. The steering control device as claimed in claim 1, wherein:
the electric motor further includes:
a motor shaft connected to the rotor; and
a sensor magnet connected to the motor shaft;
the control device includes:
a microprocessor;
a board on which the microprocessor is mounted; and
a sensor IC mounted on the board and structured to sense a change in a magnetic field of the sensor magnet; and
the board, the sensor IC, the sensor magnet, the clutch, and the rotor are arranged in an order of the board, the sensor IC, the sensor magnet, the rotor, and the clutch in a direction of a rotation axis of the motor shaft.

4. The steering control device as claimed in claim 3, wherein:
the clutch is an electromagnetic clutch;
the electromagnetic clutch includes a clutch plate, an armature, and an exciting coil;
the clutch plate is connected to the motor shaft and plate-shaped;
the armature is structured to:
be detached from the clutch plate when the armature is attracted to the exciting coil by a magnetic force generated by the exciting coil; and engage with the clutch plate so as to inhibit rotation of the rotor with respect to the motor housing when the armature is not attracted to the exciting coil; and the rotor, the clutch plate, the armature, and the exciting coil are arranged in an order of the rotor, the clutch plate, the armature, and the exciting coil in the direction of the rotation axis of the motor shaft.

5. The steering control device as claimed in claim 3, further comprising a bearing structured to bear the motor shaft, wherein the bearing and the exciting coil overlap with each other as viewed in a radial direction regarding the rotation axis of the motor shaft.

6. The steering control device as claimed in claim 1, wherein the first clutch member and the second clutch member of the clutch are structured to engage with each other when the first clutch member and the second clutch member are in arbitrary rotational positions with respect to each other.

7. The steering control device as claimed in claim 1, wherein the clutch is an electromagnetic clutch.

8. The steering control device as claimed in claim 7, wherein the electromagnetic clutch is configured to:
  release engagement between the first clutch member and the second clutch member, when the electromagnetic clutch is supplied with electric power; and
  cause the first clutch member and the second clutch member to engage with each other, when the electromagnetic clutch is supplied with no electric power.

9. The steering control device as claimed in claim 7, wherein:
  the control device includes a power supply circuit configured to supply electric power to the electric motor; and
  the electromagnetic clutch is configured to be supplied with electric power from the power supply circuit.

10. The steering control device as claimed in claim 1, wherein:
  the braking mechanism is an electric motor including a rotor and a stator coil;
  the control device includes a control circuit;
  the microprocessor includes a short circuit braking control section; and
  the short circuit braking control section is configured to bring the control circuit into a state of short circuit braking in which short circuit braking is caused by the stator coil of the braking mechanism.

11. The steering control device as claimed in claim 10, wherein the short circuit braking control section is configured to bring the control circuit into the state of short circuit braking, in response to shutoff of electric power supply to the stator coil.

12. The steering control device as claimed in claim 10, wherein:
  the clutch is an electromagnetic clutch;
  the microprocessor includes an abnormality determination section;
  the abnormality determination section is configured to determine whether or not an abnormality is present in the electric motor; and
  the short circuit braking control section is configured to bring the control circuit into the state of short circuit braking, when the abnormality determination section determines that an abnormality is present in the electric motor.

13. The steering control device as claimed in claim 10, wherein:
  the stator coil includes:
    a first stator coil; and
    a second stator coil electrically separated from the first stator coil;
  the control device includes a first control circuit and a second control circuit;
  the first control circuit includes a first inverter;
  the second control circuit includes a second inverter;
  the first inverter is configured to control electric power supply to the first stator coil;
  the second inverter is configured to control electric power supply to the second stator coil;
  the microprocessor includes an abnormality determination section;
  the abnormality determination section is configured to determine whether or not an abnormality is present in the first inverter, the second inverter, the first stator coil, and the second stator coil; and
  the short circuit braking control section is configured to:
    when it is determined that an abnormality is present in the first inverter or the first stator coil, and steering control is continued by the second control circuit and the second stator coil, bring the first control circuit into a state of non-short-circuit-braking in which no short circuit braking is caused by the first stator coil; and
    when it is determined that an abnormality is present in the second inverter or the second stator coil, and steering control is continued by the first control circuit and the first stator coil, bring the second control circuit into a state of non-short-circuit-braking in which no short circuit braking is caused by the second stator coil.

14. The steering control device as claimed in claim 10, further comprising a return spring, wherein:
  the return spring is structured to bias the steering member so as to cause the steerable wheel to return to a neutral position of the steerable wheel;
  the electric motor constitutes the actuator;
  the microprocessor includes an abnormality determination section;
  the abnormality determination section is configured to determine whether or not an abnormality is present in the electric motor; and
  the short circuit braking control section is configured to bring the control circuit into the state of short circuit braking, in response to determination that an abnormality is present in the electric motor.

15. The steering control device as claimed in claim 1, further comprising a return spring, wherein the return spring is structured to bias the steering member so as to cause the steerable wheel to return to a neutral position of the steerable wheel.

16. The steering control device as claimed in claim 1, wherein:
  the steerable wheel is a rear wheel of a vehicle;
  the microprocessor includes an abnormality determination section and a steering angle information sending section;
  the abnormality determination section is configured to determine whether or not an abnormality is present in the actuator; and
  the steering angle information sending section is configured to send information about an amount of steering of the rear wheel to a front wheel control device, in response to determination that an abnormality is present in the actuator, wherein the front wheel control device is configured to control steering of a front wheel of the vehicle.

17. A steering control device comprising:
an actuator structured to generate a steering force to steer a steerable wheel;
a steering member structured to transmit the steering force to a steering shaft;
a braking mechanism structured to generate a braking force to inhibit steering of the steering member when the steering member is in an arbitrary steering position; and
a control device configured to control the braking mechanism; wherein
the actuator is an electric motor including a motor housing, a rotor, and a stator coil;
the braking mechanism is a clutch including a first clutch member and a second clutch member;
the first clutch member is connected to the motor housing;
the second clutch member is connected to the rotor;
the first clutch member and the second clutch member are structured to engage with each other to inhibit rotation of the rotor with respect to the motor housing;
the electric motor includes a motor shaft connected to the rotor;
the clutch is an electromagnetic clutch;
the electromagnetic clutch includes a clutch plate, an armature, an exciting coil, and coil springs;
the clutch plate is connected to the motor shaft and plate-shaped;
the armature is structured to:
be detached from the clutch plate when the armature is attracted to the exciting coil by a magnetic force generated by the exciting coil;
engage with the clutch plate by being biased toward the clutch plate by the coil springs so as to inhibit rotation of the rotor with respect to the motor housing when the armature is not attracted to the exciting coil; and
the coil springs are arranged circumferentially around the rotation axis of the motor shaft.

18. A steering control device comprising:
an actuator structured to generate a steering force to steer a steerable wheel;
a steering member structured to transmit the steering force to a steering shaft;
a braking mechanism structured to generate a braking force to inhibit steering of the steering member when the steering member is in an arbitrary steering position; and
a control device configured to control the braking mechanism; wherein
the actuator is an electric motor including a motor housing, a rotor, and a stator coil;
the braking mechanism is a clutch including a first clutch member and a second clutch member;
the first clutch member is connected to the motor housing;
the second clutch member is connected to the rotor;
the first clutch member and the second clutch member are structured to engage with each other to inhibit rotation of the rotor with respect to the motor housing;
the stator coil includes:
a first stator coil; and
a second stator coil electrically separated from the first stator coil;
the control device includes a first control circuit, a second control circuit, and a microprocessor;
the first control circuit includes a first inverter;
the second control circuit includes a second inverter;
the first inverter is configured to control electric power supply to the first stator coil;
the second inverter is configured to control electric power supply to the second stator coil;
the microprocessor includes an abnormality determination section and a short circuit braking control section;
the abnormality determination section is configured to determine whether or not an abnormality is present in the first inverter, the second inverter, the first stator coil, and the second stator coil; and
the short circuit braking control section is configured to:
when it is determined that an abnormality is present in the first inverter or the first stator coil, and steering control is continued by the second control circuit and the second stator coil, bring the first control circuit into a state of non-short-circuit-braking in which no short circuit braking is caused by the first stator coil; and
when it is determined that an abnormality is present in the second inverter or the second stator coil, and steering control is continued by the first control circuit and the first stator coil, bring the second control circuit into a state of non-short-circuit-braking in which no short circuit braking is caused by the second stator coil.

* * * * *